(12) United States Patent
Vijayashekar et al.

(10) Patent No.: US 11,604,752 B2
(45) Date of Patent: Mar. 14, 2023

(54) SYSTEM FOR CROSS-ROUTED COMMUNICATION BETWEEN FUNCTIONAL UNITS OF MULTIPLE PROCESSING UNITS

(71) Applicant: Arm Limited, Cambridge (GB)

(72) Inventors: Akshay Vijayashekar, Trondheim (NO); Jussi Tuomas Pennala, Oulu (FI); Sebastian Marc Blasius, Trondheim (NO)

(73) Assignee: Arm Limited, Cambridge (GB)

( * ) Notice: Subject to any disclaimer, the term of this patent is extended or adjusted under 35 U.S.C. 154(b) by 106 days.

(21) Appl. No.: 17/163,261

(22) Filed: Jan. 29, 2021

(65) Prior Publication Data

US 2022/0245082 A1 Aug. 4, 2022

(51) Int. Cl.
*G06F 15/80* (2006.01)
*G06F 13/40* (2006.01)
*G06F 15/173* (2006.01)
*G06T 1/20* (2006.01)
*G06F 9/38* (2018.01)

(52) U.S. Cl.
CPC .... *G06F 13/4027* (2013.01); *G06F 15/17337* (2013.01); *G06T 1/20* (2013.01); *G06F 9/3885* (2013.01); *G06F 15/8023* (2013.01)

(58) Field of Classification Search
CPC ........... G06F 13/4027; G06F 15/17337; G06F 9/3885; G06F 15/8023; G06T 1/20
See application file for complete search history.

(56) References Cited

U.S. PATENT DOCUMENTS

| 7,598,958 | B1* | 10/2009 | Kelleher | G06F 9/3877 345/519 |
|---|---|---|---|---|
| 7,633,505 | B1 | 12/2009 | Kelleher | |
| 7,721,118 | B1 | 5/2010 | Tamasi | |
| 9,135,189 | B2 | 9/2015 | Chakraborty | |

(Continued)

FOREIGN PATENT DOCUMENTS

GB 2527822 1/2016

OTHER PUBLICATIONS

GB Combined Search and Examination Report, dated Jul. 21, 2016, GB Patent Application No. GB1602547.0.

*Primary Examiner* — Corey S Faherty
(74) *Attorney, Agent, or Firm* — Vierra Magen Marcus LLP

(57) ABSTRACT

A data processing system comprising a plurality of processing units. Each processing unit comprises a set of plural functional units and an internal communications network that routes communications between the functional units in a particular sequence order of the functional units. Each processing unit is connected to at least one other processing unit via a communications bridge that has at least two connections, a first connection that routes communications between a first pair of network nodes of the pair of processing units, and a separate, second connection that routes communications between a second, different pair of network nodes of the pair of processing units. Each connected pair of network nodes comprises network nodes having different positions in the internal communications network sequence order of the network nodes and/or network nodes associated with functional units of different types.

18 Claims, 14 Drawing Sheets

(56) References Cited

U.S. PATENT DOCUMENTS

| | | |
|---|---|---|
| 10,475,147 B2 | 11/2019 | Prince |
| 10,732,982 B2 | 8/2020 | Pennala |
| 2003/0164834 A1 | 9/2003 | Lefebvre |
| 2005/0041031 A1 | 2/2005 | Diard |
| 2006/0267987 A1 | 11/2006 | Litchmanov |
| 2008/0089329 A1* | 4/2008 | Ajima ................ G06F 15/17337 370/389 |
| 2008/0098208 A1 | 4/2008 | Reid |
| 2010/0011370 A1 | 1/2010 | Kubo |
| 2012/0249559 A1 | 10/2012 | Khodorkovsky |
| 2014/0218377 A1 | 8/2014 | Wu |
| 2017/0024231 A1 | 1/2017 | Reil |
| 2017/0236244 A1* | 8/2017 | Price .................... G06F 9/5066 345/504 |
| 2018/0077214 A1 | 3/2018 | Fawcett |
| 2019/0213032 A1 | 7/2019 | Eyal |
| 2019/0361770 A1* | 11/2019 | Geng ................. G06F 11/1004 |

* cited by examiner

SYSTEM FOR CROSS-ROUTED COMMUNICATION BETWEEN FUNCTIONAL UNITS OF MULTIPLE PROCESSING UNITS

BACKGROUND

The technology described herein relates to data processing systems and in particular to data processing systems that comprise plural processing units, such as plural graphics processing units (processors) (GPUs).

It is becoming increasingly common for data processing systems to require, e.g. graphics processing operations, for multiple isolated sub-systems. For example, vehicles may have a display screen for the main instrument console, an additional navigation and/or entertainment screen, and an advanced driver assistance system (ADAS). Each of these systems may require their own graphics processing operations to be performed, and it may be necessary, e.g. for formal safety requirements, for them to be able to operate independently of each other.

One approach to such systems would be to provide a single graphics processing unit (GPU) that is time shared between the different graphics processing functions that are required. However, time sharing alone may not be able to provide sufficient independence and isolation between the different sub-systems that may require graphics processing.

Alternatively, a completely separate graphics processing unit could be provided for each graphics processing function that is required. However, this may have negative implications, e.g. in terms of the number of processing components and/or cost required, as it would require the division of resources to be fixed at SoC (system on chip) creation time.

The Applicants believe therefore that there remains scope for improvements to data processing systems where the provision of plural independent data processing functions, such as graphics processing functions for plural different displays, is required.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
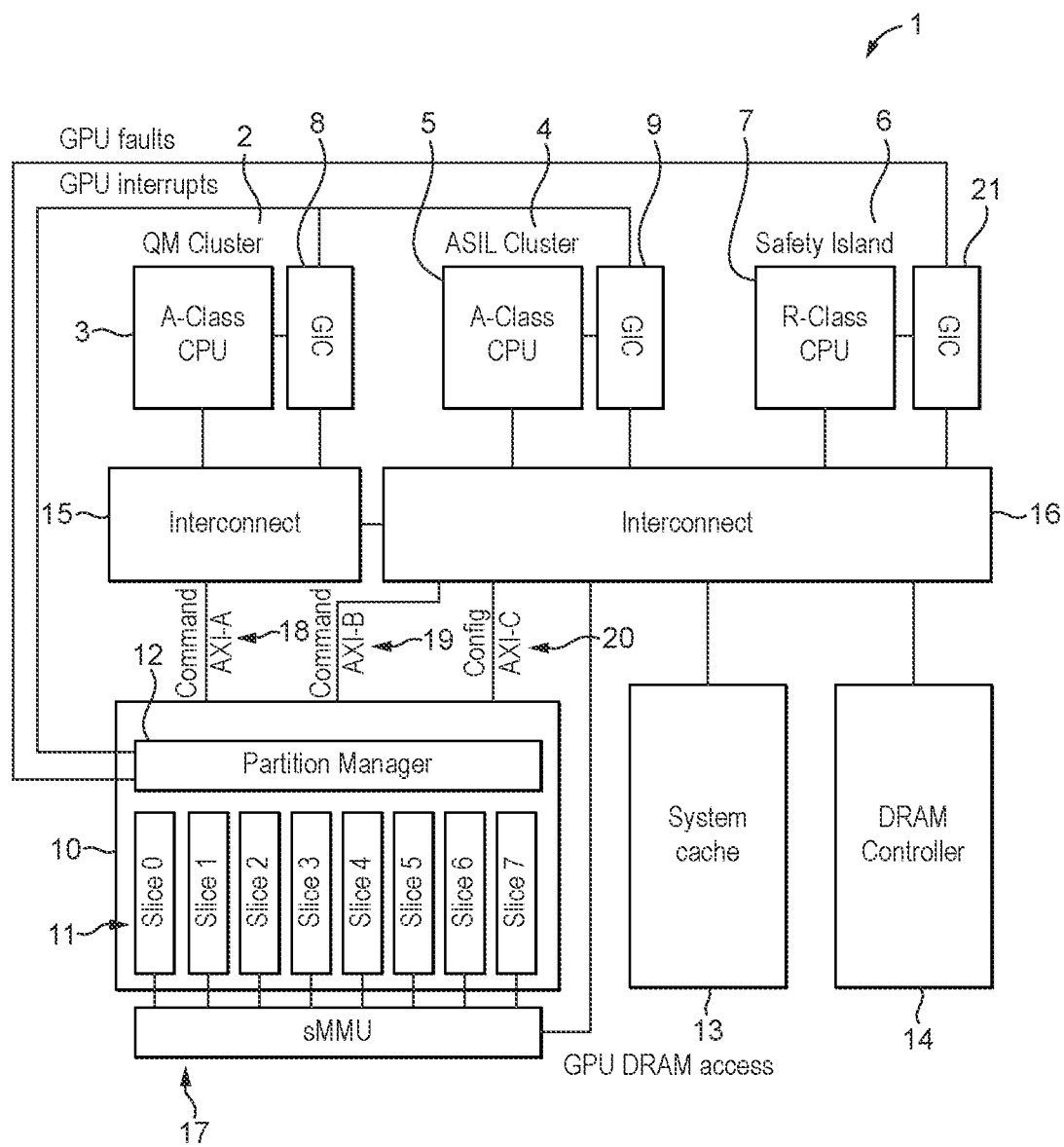
FIG. 1 shows schematically a data processing system according to an embodiment.

A first embodiment of the technology described herein comprises a data processing system comprising:

a plurality of processing units, each processing unit of the plurality of processing units comprising:

a set of plural functional units; and an internal communications network configured to route communications between the functional units of the processing unit, the internal communications network comprising a plurality of network nodes, each functional unit being associated with a node of the internal communications network;

wherein:

the internal communications networks of the processing units are each configured to route communications between at least some of the nodes of the internal communications network in the same routing sequence order of those nodes; and each processing unit of the plurality of processing units is connected to at least one other processing unit of the plurality of processing units via a communications bridge that can allow communication between the connected processing units, each communications bridge connecting a pair of processing units comprising at least two connections, each connection being configured to route communications between a respective pair of nodes of the internal communications networks of the connected pair of processing units, wherein each connected pair of network nodes comprises network nodes having different positions in the internal communications network routing sequence order of the network nodes;

whereby:

the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge; and functional units in processing units that are connected via a communications bridge and that each have the same relative position in the internal communications network of the processing units relative to the communications bridge connecting the processing units will use a different one of the connections of the communications bridge when communicating with the connected processing unit via the communications bridge connecting the pair of processing units.

A second embodiment of the technology described herein comprises a method of operating a data processing system, the data processing system comprising:

a plurality of processing units, each processing unit of the plurality of processing units comprising:

a set of plural functional units, and an internal communications network configured to route communications between the functional units of the processing unit, the internal communications network comprising a plurality of network nodes, each functional unit being associated with a node of the internal communications network;

wherein:

the internal communications networks of the processing units are each configured to route communications between at least some of the nodes of the internal communications network in the same routing sequence order of those nodes; and each processing unit of the plurality of processing units is connected to at least one other processing unit of the plurality of processing units via a communications bridge that can allow communication between the connected processing units, each communications bridge connecting a pair of processing units comprising at least two connections, each connection being configured to route communications between a respective pair of nodes of the internal communications networks of the connected pair of processing units, wherein each connected pair of network nodes comprises network nodes having different positions in the internal communications network routing sequence order of the network nodes; whereby:

the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge; and functional units in processing units that are connected via a communications bridge and that each have the same relative position in the internal communications network of the processing units relative to the communications bridge connecting the processing units will use a different one of the connections of the communications bridge when communicating with the connected processing unit via the communications bridge connecting the pair of processing units;

the method comprising:

when sending a communication from a functional unit of a first processing unit to a connected second processing unit via a communications bridge linking the processing units, the functional unit having a first position relative to the communications bridge linking the processing units, sending the communication over a first one of the connections of the communications bridge linking the processing units; and when sending a communication from a functional unit of the connected second processing unit which has the same relative position to the communications bridge linking the processing units in the internal communications network of the second processing unit to the first position relative to the communications bridge linking the processing units of the functional unit in the first processing unit to the first processing unit via the communications bridge linking the processing units, sending the communication over another one of the connections of the communications bridge linking the processing units that is different to the first one of the connections of the communications bridge linking the processing units.

The technology described herein relates to a data processing system that includes plural processing units (e.g. graphics processing units). Each processing unit has a plurality of functional units and an internal communications network for routing communications between the functional units.

The plural processing units are further connected to each other via communication bridges such that they can communicate with each other.

As will be discussed further below, the effect of this then is that the plural processing units can be operated (e.g. from the perspective of an application processor that requires processing operations) both as individual processing units, and/or with some or all of the processing units "linked" together to perform a processing operation together (in combination).

Furthermore, the communications bridges that connect the respective processing units to each other are configured so as to route communications between (at least) two respective pairs of internal communications network nodes of the processing units, and such that each connected pair of network nodes comprises network nodes that have different positions in the internal communication network routing sequence order of the processing units.

In other words, each communications bridge connecting a pair of processing units comprises at least a first connection configured to route communications between a first pair of network nodes of the pair of processing units, and a separate, second connection configured to route communications between a second, different pair of network nodes of the pair of processing units, with each connected pair of network nodes comprising nodes having different positions in the internal communications network routing sequence order of the network nodes of the processing units (e.g., such that one connected pair of nodes may comprise the second node in the routing sequence in the first processing unit and the third node in the routing sequence in the other, connected processing unit of the pair of connected processing units, and another (the other) connected pair of network nodes may comprise the third node in the routing sequence in the first processing unit and the second node in the routing sequence in the other, connected processing unit of the pair of connected processing units (other arrangements would, of course, be possible)).

The effect of this then is that the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge, and functional units in processing units that are connected via a (the same) communications bridge having the same relative positions in the internal communications networks of the processing units relative to the communications bridge connecting the processing units will use a different one of the connections of the communications bridge when communicating with the connected processing unit via the communications bridge connecting the pair of processing units.

As will be discussed in more detail below, the effect of this then is that the connections of the communications bridges that will be used for communications from a functional unit in a processing unit to a connected processing unit in a linked set of plural processing units will depend upon the position of the functional unit in its processing unit relative to the communications bridge of that processing unit, and the position of the processing unit itself in the linked sequence of processing units.

Thus, for example, and in particular, where functional units that are in the same relative position in the network routing in different (e.g. adjacent) processing units of a set of processing units wish to communicate with the same resource (e.g. functional unit) in another processing unit of the linked set of processing units, then depending upon the position of the processing units in the linked sequence of processing units, the communications to that same functional unit that is, e.g. acting as a shared resource for the linked set of processing units, will traverse different connections of the communications bridges of the connected processing units (i.e. will follow different communications paths to (and from) the "shared resource" functional unit).

As will be discussed further below, the Applicants have found and recognised that this arrangement can thus provide more efficient communications between processing units in such a system, in particular in the case where functional units of processing units in a linked set of plural processing units wish to communicate with a functional unit(s) of another processing unit of the linked set of plural processing units. In particular, the technology described herein can reduce or avoid bottlenecks when communicating between different processing units in a linked set of plural processing units.

The data processing system may comprise any desired and suitable plural number of processing units. In an embodiment, there are four or eight processing units, but the data processing system may comprise more or fewer processing units, as desired.

The processing units may be any suitable and desired form of processing units. In an embodiment, they are processing units that are intended to perform particular forms of processing operation, and in particular that, in an embodiment, function as hardware accelerators for a particular form or forms of processing operation. Thus the processing units may, for example, be, as discussed above, graphics processing units (graphics processors), but they may also, e.g., be other forms of processing unit and accelerator, such as video processing units, machine learning accelerators, neural network processing units, etc.

Each processing unit of the system (that is configured in the manner of the technology described herein) should perform (accelerate) the same type of processing (thus the processing units will all be graphics processing units, or will all be video processing units, or will all be machine learning accelerators, etc.).

In an embodiment the processing units are (all) graphics processing units. In this case, the graphics processing units of the data processing system can comprise any suitable and desired form of graphics processing units (graphics processors (GPUs)). They may perform any suitable and desired form of graphics processing, such as rasterisation-based rendering, ray-tracing, hybrid ray-tracing, etc. In an embodiment the graphics processing units are tile-based graphics processing units.

This being the case, the technology described herein will be described below primarily with reference to the processing units being graphics processing units. However, unless the context requires otherwise, the described features of the technology described herein can equally and analogously be applied to and used for other forms of processing unit, and the technology described herein extends to systems using forms of processing unit other than graphics processing units.

Each processing unit of the plurality of processing units includes a set of plural functional units. The set of functional units of a processing unit may comprise any and all of the functional units that processing units of the type in question may comprise, as desired. Each processing unit may have the same set of functional units, or some or all of the processing units may have at least some differences in terms of their functional units.

In one embodiment, each processing unit of the plurality of processing units has the same set of functional units.

In another embodiment, one or more of the processing units have different sets of functional units to others of the processing units. In this case, the difference could be in terms of the number of a particular type of functional unit (e.g. some processing units may have more execution units (cores) than other processing units), and/or some processing units may have a type of functional unit that other processing units do not have (such as a tiler in the case of tile-based graphics processors).

Where different processing units have different sets of functional units, the processing units in an embodiment have at least some functional units in common. The processing units may also have at least some functional units not in common. In one embodiment, the processing units have at least the functional units that are connected by the communications bridges in common. In another embodiment, the processing units have at least the functional units that are connected by the communications bridges not in common.

The sets of functional units of the processing units in an embodiment comprise one or more of, in an embodiment plural of, and in an embodiment all of the following types of functional unit: one or more execution units (execution cores) (shader cores in the case of a graphics processor), in an embodiment that are or include programmable processing circuits operable to execute programs to perform data processing operations; a management unit (e.g. a job manager) that provides a host processor (or virtual machine) (software) interface for the processing unit (and is in an embodiment also operable to divide a data processing task allocated to the processing unit into subtasks and to distribute the subtasks for execution to the execution unit or units of the processing unit); a cache (e.g. an L2 cache) that provides an interface to an external (main) system memory of the data processing system; and a memory management unit (MMU) (however, appropriate memory management units could also or instead be located externally to the processing unit or units, if desired).

The processing units may, and in an embodiment do, comprise one of each type of functional unit, except for the execution units, where the processing units may, and in an embodiment do, comprise plural execution units (such as 3 or 4 execution units, e.g. a graphics processor may comprise 3 or 4 shader cores).

The processing units may also comprise other functional units, depending upon the purpose of the processing units. For example, a tile-based graphics processing unit may also include a tiling unit (a tiler).

All the functional units of the same type in the processing units may be the same as each other (e.g., and in an embodiment, in terms of their resources and/or processing capabilities, etc.), or one or more of the functional units of the same type may differ from each other, as desired. For example, in a tile-based graphics processing system, different processing units may have different capability tilers (tiling circuits), e.g. in terms of their throughput.

The functional units may be provided as desired, such as, and in an embodiment in the form of appropriate processing circuits (logic, etc.). They may be provided as fixed function circuits and/or as programmable processing circuits, e.g. depending on the function in question. Different functional units of a given processing unit may also share processing circuits if desired and as appropriate.

Each processing unit comprises an internal communications network for routing communications between the functional units of the processing unit. This communications network is in an embodiment operable and configured to carry one or more of, and in an embodiment both of: memory transaction communications (such as memory access transactions between execution units and/or the cache of the processing unit, and/or memory translation transactions between micro-TLBs (translation lookaside buffers) associated with functional units and an MMU of the processing unit); and control communications (such as subtask control traffic between the management unit and execution units).

A (and each) internal communications network of a processing unit comprises a plurality of network nodes, with each functional unit being associated with a node of the internal communications network of the processing unit. (However, it should be noted here that there may also be nodes of the internal communication network for a (and for any) processing unit that are not associated with any functional unit, if desired. Thus the internal communications networks may comprise both nodes that are associated with functional units and nodes that are not associated with functional units.)

Correspondingly, the internal communications network of a processing unit will, and in an embodiment does, comprise a set of (linked) nodes, with at least some of the nodes being associated with a given functional unit of the processing unit (which functional unit will accordingly act as an "endpoint" for the node in question), and each node being able to route communications to its associated functional unit (if any) or to another node, as appropriate.

Thus each node of a network in an embodiment comprises a node to which communications (e.g. messages) can be directed (addressed) and is configured to, where the node is associated with a functional unit, either forward a communication (message) that is for the associated functional unit to the functional unit in question to act upon, but otherwise to forward a communication (message) that is not for its associated functional unit onwards over the network (to the next node in the routing sequence of the nodes). Correspondingly, for any node that is not associated with a functional unit, that node will be configured to forward a communication onwards over the network to the next node in the network node routing sequence.

Correspondingly, each functional unit in an embodiment has associated with it (e.g. includes) a node of the network to which communications (e.g. messages) can be directed (addressed), and which node is in an embodiment operable to forward a communication (message) that is for the functional unit in question to the functional unit in question to act upon, but otherwise to forward a communication (message) that is not for the functional unit in question onwards over the network (to the next node in the network routing sequence).

(Thus, references to the nodes and/or functional units being connected for communications routing purposes refer to, and encompass, both routing communications to, and routing communications via, the nodes and/or functional units in question. Correspondingly, references herein to the functional units being connected for communications routing purposes and to routing communications between functional units refer to connecting the communications network nodes associated with the functional units and to routing communications between the network nodes associated with the functional units in question.)

The internal communications networks of the processing units can be provided as desired, but in an embodiment are provided as a, in an embodiment message based, interconnect using switches.

Correspondingly, some, and in an embodiment all, of the nodes in an embodiment also include or have associated with them one or more switches that may be set to enable and disable communications to and from the node (and from all or only some directions, as required).

As will be discussed further below, the routing of the internal communications networks (the interconnect) can in an embodiment be reconfigured in use, e.g., and in an embodiment, depending upon whether the processing unit is operating on its own or as part of a linked set of plural processing units. This is in an embodiment done by appropriately configuring the switches in the communications network.

The internal communications network of a (and of each) processing unit is configured to route communications between at least some of, and in an embodiment all of, the nodes of the network (and thus, accordingly, functional units) of the processing unit in a (the same) particular (logical) communications routing sequence order of those (the) nodes (functional units), i.e. such that for a given node (and thus functional unit), any communication to be passed on internally (within the processing unit) from that node (functional unit) will always be passed to the same next node (e.g. functional unit) of the processing unit (in the direction in question).

Correspondingly, the effect of this routing should be, and is in an embodiment, such that which of the connections of a communications bridge communications from a functional unit will use, will depend upon the (logical) position of that functional unit in the internal communications network routing sequence. Correspondingly, all those functional units having the same relative (logical) position to the communications bridge of a processing unit (e.g. all the nodes (and thus functional units) on one side of (e.g. "below") the communications bridge in the network routing sequence) will use one connection of the communications bridge when sending communications to a connected processing unit, and the functional units/nodes having another (the other) relative (logical) position in the internal communications network routing sequence order to the communications bridge (e.g. that are that are on the other side of (e.g. "above") the communications bridge in the network routing sequence) will use another (the other) connection of the communications bridge when sending communications to a connected processing unit.

In other words, which connection of the processing units' communications bridges a given functional unit/node will use when sending communications to a connected processing unit will, and in an embodiment does, depend upon, and is in accordance with, the relative position of that functional unit/node to the communications bridge connections in the internal network routing configuration.

(It should be noted here that while the relative routing position of a node/functional unit should, as set out above, and in an embodiment does, determine which connection of the communications bridge is used when sending communications from that node/functional unit to a connected processing unit via the communications bridge, communications for a functional unit/node from another processing unit may use any (either) of the connections of the communications bridges (in dependence upon the location of the source of the communication). Thus the relative position of a functional unit/node should, and in an embodiment does, determine which communications bridge connections will be used for communications from that functional unit/node, but communications to that functional unit/node can come over any (either) of the connections.)

In an embodiment, the internal communications network is configured to route communications between at least some, and in an embodiment all, of the nodes (functional units) of the processing unit in a linear routing sequence ("daisy-chain") of the nodes (functional units), i.e. such that those (the) nodes (functional units) are, in effect, arranged (logically) in a line (in series) from the point of view of the internal communications network, with communications then being passed along the line of nodes (functional units) (in one direction or the other, depending on the direction of the communication).

Thus, in this case an "end" node (end functional unit) in the linear routing sequence will always send and receive communications over the internal network to and from its adjacent node (functional unit) in the line (in the logical routing sequence), and an "intermediate" node (functional unit) in the linear routing sequence will always send and receive communications over the internal network to and from one of its adjacent nodes (functional units) in the line (in the logical routing sequence) (depending upon which way along the linear routing sequence the message is being sent).

In the case of the processing units including functional units as set out above, then in an embodiment the communications routing sequence over the internal network of a (and each) processing unit is as follows: a functional unit other than a cache or MMU, such as, and in an embodiment, an execution unit (or a set or sequence of execution units where there is more than one execution unit)—cache (level 2 cache)—memory management unit (MMU)—a functional unit other than a cache or MMU, such as, and in an embodiment, a management unit (with communications being able to be sent in both directions along the routing sequence but always following the routing sequence order). It would also be possible to swap the order of the cache and MMU in this sequence, if desired.

In the case of a tile-based graphics processor, then in an embodiment the communications routing sequence over the internal network of a (and each) processing unit is correspondingly as follows: a functional unit other than a cache or MMU, such as, and in an embodiment, an execution unit (or a set or sequence of execution units where there is more than one execution unit)—cache (level 2 cache)—memory management unit (MMU)—a functional unit other than a cache or MMU, such as, and in an embodiment, a tiling unit—management unit (with communications being able to be sent in both directions along the routing sequence but always following the routing sequence order). Again, the order of the cache and MMU could be swapped if desired.

There may also be nodes not associated with functional units in these sequences, if desired, but the "functional unit" nodes in an embodiment follow this sequence order, even if there are intermediate nodes between the "functional unit" nodes.

Thus, in an embodiment, the internal networks route communications that are to pass from the execution unit(s) to or via the MMU (e.g. to the management unit) via the cache (i.e. in the routing sequence: execution unit—cache—MMU), and communications that are to pass from or via the MMU (e.g. from the management unit) to the execution unit(s) via the cache (i.e. in the sequence: MMU—cache—execution unit).

Each processing unit in an embodiment has the same internal network communications topology (save, for example, for any differences in the actual functional units of the processing units). Thus, each processing unit in an embodiment has and uses the same communications network topology for the functional units over the internal communications network, save for any "missing" functional units of the processing unit in question.

Each processing unit correspondingly in an embodiment has the same communications routing sequence order of the nodes and functional units within its internal communications network topology as the other processing units (save, for example, for any differences in the actual functional units of the processing units). Thus, each processing unit in an embodiment has and uses the same routing (sequence) order of the functional units over the internal communications network, save for any "missing" functional units of the processing unit in question. Correspondingly all the processing units in an embodiment have and use the same routing (sequence) order over the internal communications network for the functional units that are common to (present in) all of the processing units (but, e.g, at least some individual processing units may have additional, different functional units "inserted" into that routing sequence).

The functional units of a (and each) processing unit are in an embodiment (physically) arranged in an order corresponding to the (logical) communications routing sequence order, as that will then, e.g., facilitate providing an internal communications network that can route communications in the desired functional unit routing (sequence) order.

Correspondingly, in an embodiment all of the processing units of the plurality of processing units have their functional units in the same (physical) arrangement (in an embodiment corresponding to the (logical) communications routing sequence order). This will then facilitate more straightforwardly instantiating processing units multiple times in an integrated circuit and so facilitate more straightforward manufacture of the data processing system, as it would be possible to form the data processing system of linkable processing units simply by instantiating such a "standard" processing unit design multiple times in an integrated circuit.

As discussed above, each processing unit of the plurality of processing units is connected to at least one other processing unit of the plurality of processing units via a communication bridge. Each processing unit may be connected via a bridge to only one other processing unit, or it could be connected to plural other processing units, e.g. depending upon the configuration and layout of the processing units and how many processing units there are in the data processing system.

In an embodiment there is a separate bridge for each other processing unit that the processing unit in question is connected to. Thus, for example, where a processing unit is connected to two other processing units of the plurality of processing units, then that processing unit will have two communications bridges, with each communications bridge connecting the processing unit to a respective other processing unit of the plurality of processing units.

In an embodiment, a processing unit is connected either to one or to two other processing units. In the case where there are only two processing units in the plurality of processing units, then each processing unit will be connected to one other processing unit. Where there are more than two processing units in the plurality of processing units, then in an embodiment some of the processing units in the plurality of processing units are connected to one other processing unit, and others of the processing units are connected to two other processing units of the plurality of processing units.

Thus, in an embodiment, a processing unit can be connected to a maximum of two other processing units (and accordingly may have two but no more than two communications bridges).

In an embodiment, the processing units are arranged and configured as a (logical) linear sequence (line) ("daisy-chain") of the processing units, with respective communications bridges connecting adjacent processing units in the (linear) sequence (daisy-chain) (i.e. such that only immediately adjacent pairs of processing units in the sequence are directly connected to each other). Thus there will, for example, be a sequence of 4 or 8 processing units connected (at least from a logical, communications, perspective) in a line.

In this case an "end" processing unit in the linear sequence will be connected to its one adjacent processing unit in the line (in the logical sequence) by a communications bridge, and an (and each) "intermediate" processing unit in the linear sequence will be connected by two separate communications bridges to its two respective adjacent processing units in the sequence.

Other arrangements would, of course, be possible.

Each communications bridge will, and in an embodiment does, allow direct communication between the two processing units that the bridge connects.

The processing units and/or bridges are in an embodiment configurable in use to either allow or prevent communication with another processing unit via a bridge. This can be achieved in any desired and suitable manner. In an embodiment the processing units include appropriate switches (e.g. the switches of the internal communications network discussed above) that can be set to allow or prevent communication via a communications bridge.

The bridges connecting the processing units in an embodiment provide and support an asynchronous interface between the processing units. This facilitates physical implementation of the processing units, as the clock for each processing unit may then be independent even when the processing units are communicating via their bridges.

Each communication bridge between two processing units comprises (at least) a first connection configured to route communications between a first pair of internal communications network nodes of the connected processing units and a second, separate connection configured to route communications between a second, different pair of internal communications network nodes of the connected processing units. In other words, there will be one connection between a node of the first processing unit of the pair of connected processing units and a node of the second processing unit, and another, second connection between another, different node of the first processing unit of the pair of connected processing units and another, different node of the second processing unit.

A (and each) communications bridge may include one or more further connections, such as a third connection, between further respective (and different) pairs of internal communications network nodes of the processing units, if desired. In an embodiment a (and in an embodiment each) communications bridge comprises two and only two connections.

The pairs of network nodes that are connected comprise nodes that have different positions in the internal communications network routing sequence order of the nodes in the connected processing units. Thus, a node that is connected to another node in another processing unit will be connected to a node in that other processing unit that has a different position to it in the routing sequence order. For example, if the nodes are considered to have routing sequence positions n−1, n, n+1 (etc., as required), then the node having position n in the routing sequence in one processing unit, if connected by the bridge, will be connected to a node having a position other than position n in the other processing unit.

The pairs of network nodes that are connected in an embodiment comprise nodes that have adjacent positions in the routing sequence. Thus, in the example above, the node having an intermediate position n in the routing sequence in one processing unit, if connected by the bridge, is in an embodiment connected to the node having position n−1 or the node having position n+1 in the other processing unit. Similarly, the node having an end position n−1 in the routing sequence in one processing unit, if connected by the bridge, is in an embodiment connected to the node having position n in the other processing unit.

Each connection of the communications bridge connects a different pair of the nodes of the connected pair of processing units. In an embodiment the connections "mirror" each other, at least in the case where there are two connections, i.e. such that one connection connects a first routing sequence position in the first processing unit to a second routing sequence position in the second processing unit, and the other connection connects the second routing sequence position in the first processing unit to the first routing sequence position in the second processing unit.

For example, in the example given above, one connection may connect position n to position n+1, and the other connection connect position n+1 to position n.

In an embodiment, each communications bridge has the same configuration of connections, but other arrangements where different bridges have different connection configurations would be possible, if desired. For example different configuration connections could be repeated at an appropriate frequency along the sequence of connected processing units, if desired.

The actual internal communications network nodes that the communications bridges connect can be selected as desired. It would be possible in this regard to connect nodes that are associated with a functional unit and/or nodes that are not associated with a functional unit. Thus each of the connections of the communications bridge could connect two nodes, each associated with a functional unit (in the different processing units), or two nodes, neither of which are associated with a functional unit (in the processing unit in question), or one node in one processing unit that is not associated with a functional unit, and one node in the other processing unit that is associated with a functional unit.

In an embodiment, at least one, and in an embodiment both (or all) of the connections of a (and of each) communications bridge connect nodes associated with functional units of the connected processing units. Thus, in this case, each communications bridge between two processing units will comprise (at least) a first connection configured to route communications between the communications network nodes of a first pair of functional units of the processing units, and a second, separate connection configured to route communications between the communications network nodes of a second, different pair of functional units of the connected processing units.

In this case, the actual functional units whose associated nodes the communications bridges connect can be selected as desired. This may, for example, be based on the positions of the functional units in the internal network routing sequence, and/or the (e.g. type of) functional units to connect may be selected, with that selection then correspondingly determining the positions in the routing sequence that are then connected.

In an embodiment, the functional units whose associated nodes are connected via the connections of the communications bridges comprise functional units that will act as shared resources for a linked set of the processing units (i.e. functional units that the processing units of a linked set of processing units other than the processing unit that the functional unit is actually part of will be likely to and intended to use (need to communicate with) when the set of linked processing units is operating together). Such functional units that will act as shared resources may, for example, and in an embodiment, be the caches or MMUs of the processing units.

Thus in an embodiment, a (and each) communications bridge connection links (the node for) a functional unit that will provide a shared resource for a linked set of processing units in one of the connected processing units and (the node for) another functional unit in the other connected processing unit (which is in an embodiment also a functional unit that will act as a shared resource for the linked set of processing units).

In this case, the functional unit that is acting as a shared resource is in an embodiment a functional unit that will be active in plural, and in an embodiment in all, of the linked processing units of the set as a shared resource for the linked processing units of the set of linked processing units (such as a cache of the processing units). The other functional unit, if also acting as a shared resource, may be a "shared resource" functional unit that will only be active in one of the processing units of a linked set of processing units (such that that functional unit in one processing unit of the linked set of processing units will act as the sole instance of that functional unit for the linked set of processing units), such as an MMU.

In an embodiment, at least one of the connected functional units is a functional unit that will be active in plural, and in an embodiment in each, of the processing units of a linked set of processing units, and provide a shared resource to plural, and in an embodiment to all, of the processing units in the linked set of processing units.

In an embodiment, the functional units that are connected (whose network nodes are connected) are based on the expected communications traffic to and/or through the functional units (and in an embodiment on the expected communications traffic to and/or through the functional units when plural processing units are operating together as a linked set of plural processing units).

The Applicants have recognised in this regard that certain types of communications traffic may be higher (consume greater bandwidth) than other types of communications traffic in use. For example, there may be a relatively high amount and desired throughput of memory transaction traffic from execution units to caches (and vice-versa), but relatively less traffic for memory translation transactions between the MMU and (micro)TLBs (and vice-versa).

In an embodiment, each connection of a (and in an embodiment of each) communications bridge is between a node for a functional unit in one processing unit for which a higher volume of communications traffic would be expected and a node for a functional unit in the other processing unit of the connected pair of processing units for which a lower volume of communications traffic would be expected.

The connections of the communications bridges will then carry both types of traffic and that traffic will be distributed over both (all) connections of the communications bridge(s), thereby distributing the traffic more evenly over the connections of the communications bridges, and thereby reducing or avoiding bottlenecks, as compared, for example, to having a single connection only for both types of traffic, or separate connections for low and high bandwidth traffic.

Thus, in an embodiment a (and in an embodiment each) communications bridge has one connection connecting the (node for the) cache in the first processing unit of the pair of processing units that the bridge connects to (the node for) a functional unit other than the cache in the other processing unit of the pair, and a separate, second connection connecting (the node for) a functional unit other than the cache in the first processing unit of the pair to the (node for the) cache in the other processing unit of the pair. In this case, the functional unit other than the cache is in an embodiment a functional unit for which a lower volume of communications traffic would be expected, such as, and in an embodiment, an MMU of the processing unit.

Correspondingly, each communications bridge connection in an embodiment connects (the internal communications network nodes of) functional units of different types in the two connected processing units, such as a cache and something other than a cache.

Indeed, it is believed that having communications bridges having plural connections that each connect functional units of different types to each other may correspondingly be new and advantageous in its own right. In particular, connecting functional units of different types in the connected processing units will cause the communications traffic to be more evenly distributed over the plural connections, e.g. based on the source of the communication and the relative positions of the processing units in a linked set of processing units.

Thus, another embodiment of the technology described herein comprises a data processing system comprising:
a plurality of processing units, each processing unit of the plurality of processing units comprising:
  a set of plural functional units; and
  an internal communications network configured to route communications between the functional units of the processing unit, the internal communications network comprising a plurality of network nodes, each functional unit being associated with a node of the internal communications network;
wherein:
each processing unit of the plurality of processing units is connected to at least one other processing unit of the plurality of processing units via a communications bridge that can allow communication between the connected processing units, each communications bridge connecting a pair of processing units comprising at least two connections, including a first connection configured to route communications between a network node associated with a functional unit of one type in the first processing unit of the connected pair of processing units and a network node associated with a functional unit of a different type in the other processing unit of the connected pair of processing units, and a separate, second connection configured to route communications between network nodes associated with a second, different pair of functional units of the pair of processing units, connecting a network node associated with a functional unit of one type in the first processing unit of the connected pair of processing units to a network node associated with a functional unit of a different type in the other processing unit of the connected pair of processing units.

Another embodiment of the technology described herein comprises a method of operating a data processing system, the data processing system comprising:

a plurality of processing units, each processing unit of the plurality of processing units comprising:
   a set of plural functional units; and
   an internal communications network configured to route communications between the functional units of the processing unit, the internal communications network comprising a plurality of network nodes, each functional unit being associated with a node of the internal communications network;

wherein:

each processing unit of the plurality of processing units is connected to at least one other processing unit of the plurality of processing units via a communications bridge that can allow communication between the connected processing units, each communications bridge connecting a pair of processing units comprising at least two connections, including a first connection configured to route communications between a network node associated with a functional unit of one type in the first processing unit of the connected pair of processing units and a network node associated with a functional unit of a different type in the other processing unit of the connected pair of processing units, and a separate, second connection configured to route communications between the network nodes associated with a second, different pair of functional units of the pair of processing units, connecting a network node associated with a functional unit of one type in the first processing unit of the connected pair of processing units to a network node associated with a functional unit of a different type in the other processing unit of the connected pair of processing units;

the method comprising:

when sending a communication from a first processing unit to a connected second processing unit via the communications bridge linking the processing units:

sending the communication over one of the connections of the communications bridge linking the processing units from a network node associated with a functional unit of a first type of the first processing unit to a network node associated with a functional unit of a different type of the second processing unit.

As will be appreciated by those skilled in the art, these embodiments of the technology described herein can, and in an embodiment do, contain any one or more or all of the features of the technology described herein, as appropriate.

Thus, for example, each connection of a (and in an embodiment of each) communications bridge in an embodiment connects (the node of) a cache in one processing unit to (the node of) something other than a cache (such as an MMU) in the other processing unit of the connected pair of processing units. Correspondingly, the method in an embodiment comprises sending the communication from the cache of the first processing unit to something other than the cache of the second processing unit (or vice-versa).

It will be appreciated from the above that the connections of the communications bridges will, and in an embodiment do, provide two (or more than two, where each communication bridge has more than two connections) communications paths over which communications may be sent for a sequence of connected processing units. In other words, the connections of a successive communications bridges connecting a sequence of (connected) processing units will form as many different communications paths along the sequence of (connected) processing units as the number of connections that each communications bridge has. Moreover, those communications paths will pass through different network nodes (and thus, in effect, and where appropriate, different functional units) in adjacent processing units of the sequence.

Similarly, which communications path of the different communications paths communications from a given functional unit will use will depend both upon the relative position of the functional unit in the processing unit to the communications bridge connections for that processing unit, and the relative position of the processing unit in the connected sequence of the processing units. This will all have the effect then of more evenly distributing communications traffic over the plural different communications paths provided by the communications bridge connections.

In an embodiment, the processing units are connected together by communications bridges having "mirrored" connections, such that the connections of the communications bridges forming a given communications path will, in effect, connect (the nodes for) functional units in an alternating manner along the sequence of connected processing units.

Thus, for example, and in an embodiment, one sequence of communication bridge connections will connect the, e.g, and in an embodiment, (node for the) cache in the first processing unit to (the node for) something other than the cache (e.g. the MMU) in the next (second) processing unit, and then to the (node for the) cache in the next (third) processing unit and then to (the node for) something other than the cache in the next (fourth) processing unit in the sequence (if any) (and so on, as required), and the other sequence of communication bridge connections will connect (the node for) something other than the cache in first processing unit to the (node for the) cache in the next (second) processing unit, and then to (the node for) something other than the cache in the next (third) processing unit and then to the (node for the) cache in the next (fourth) processing unit in the sequence (if any) (and so on, as required).

It will be appreciated that where the connections of successive communications bridges are arranged in this manner, the sequence of bridges will form two communications paths along the sequence of (connected) processing units, that, in effect, cross over each other at each bridge.

In an embodiment, each processing unit and connection bridge is aligned in the same way in the layout of the processing units and connection bridges, so that that processing units and connection bridges can straightforwardly be instantiated multiple times in an integrated circuit. This will then facilitate more straightforward manufacture of the data processing system, as it would be possible to form the data processing system of linked processing units simply by instantiating such a "standard" processing unit and communications bridge design multiple times in an integrated circuit.

The communications bridges connecting the processing units allow processing units to be linked together, so that they can operate together as a "linked" set of plural processing units.

In an embodiment, some or all of the processing units can be operated independently, as standalone processing units, and some or all of the processing units are also able to be operated in a combined manner, as a "linked" set of the processing units (in an embodiment with one of the processing units in the "linked" set (that thereby acts as primary, "master" processing unit) controlling operations of other one(s) of the processing units of the "linked" set (that thereby act as secondary, "slave" processing unit(s)).

Thus, in an embodiment, at least some of the processing units are able to be operated as standalone processing units, and at least some of the processing units are able to be operated in combination with others of the processing units, to thereby provide a combined (linked) set of processing units that operate together.

In an embodiment all of the processing units of the system can both operate as standalone processing units and in combination with other processing units of the system, but it would also be possible for, e.g., only some of the processing units to be able to operate as standalone processing units (e.g. such that some processing units can only operate in combination with other processing units (e.g. as a slave processing unit)). Correspondingly, it could be the case that only some but not all of the processing units are able to operate in combination with other processing units.

Correspondingly, in embodiments, at least one of (and in an embodiment some but not all of) the processing units are also or instead operable to act as a primary (master) processing unit and control the processing operations of another one or ones of the processing units. Similarly, at least one of (and in an embodiment some but not all of) the processing units in an embodiment are also or instead operable to act as a secondary (slave) processing unit to perform processing operations under the control of a primary (master) processing unit of the processing units.

In an embodiment, the processing units are able to be configured as respective "partitions" of processing units, with each partition being able to be independently (and respectively) allocated, e.g. to a (different) virtual machine (at any given time), and comprising a subset of one or more of the processing units.

In this case, a given partition of processing units may comprise a single processing unit (which in that case will operate as a "standalone" processing unit), or a plurality of combined ("linked") processing units (e.g., and in an embodiment, comprising a master and one or more slave processing units) that collectively operate together to provide processing functions, e.g. to a virtual machine that is using that partition of the processing units.

When operating in a "standalone" mode the processing unit will operate on its own (not in combination with any of the other processing units) to perform a desired processing task (operation), and in an embodiment operates independently of the other processing units, in an embodiment under direct control from software (e.g., and in an embodiment, under the control of an appropriate driver for the processing unit that is executing on a (e.g. host) processor of the overall data processing system that the data processing system is part of).

When operating in standalone mode, a processing unit in an embodiment does not have any internal dependencies on any of the other processing units. Thus, each processing unit in an embodiment has a separate clock and reset, so that there should be no internal dependencies on any of the other processing units of the plurality of processing units when operating in the standalone mode.

In this mode of operation, a management unit that provides the software interface for the processing unit in question in an embodiment partitions the processing task of the processing unit into subtasks and distributes the subtasks for execution to the various execution units of the processing unit.

When a processing unit of the plurality of processing units is to operate in either master mode or slave mode, then the operation of the processing unit can be, and is in an embodiment, modified from its operation when operating in standalone mode, e.g., and in an embodiment, to take account of the fact that the processing unit is acting as a master or as a slave, respectively.

In an embodiment, when a processing unit is operating in master mode (as a master (primary) processing unit controlling other processing units of the plurality of processing units operating in slave mode), the master processing unit acts as and provides the host (software) interface for the set of processing units that it is acting as a master processing unit for (i.e. for the linked set of processing units comprising the master (primary) processing unit and its associated slave (secondary) processing units).

Thus, in an embodiment, when a processing unit is acting as a master processing unit, the management unit for that master processing unit provides the software interface for the linked set of master and its respective slave processing units, and so all communication between the, e.g. driver, on the, e.g. host processor that allocates processing tasks to the linked set of processing units in an embodiment takes place via the management unit of the master processing unit (i.e. there is no direct communication between the driver and the slave processing units of the linked set of processing units).

Correspondingly, in an embodiment the master processing unit, and in an embodiment the management unit of the master processing unit, is operable to partition any processing task allocated to the linked set of processing units into subtasks and to distribute those subtasks for execution to execution units not only of the master processing unit but also to execution units of one or more of, and in an embodiment plural of, and in an embodiment all of, the slave processing units that are linked to the master processing unit. This then allows the master processing unit to, in effect, distribute processing task processing across the slave processing units that it is controlling, but the arrangement is such that from the driver (application) side, there is still only a single processing unit that is being instructed and to which the processing task is being sent.

Correspondingly, when a processing unit is to operate in slave mode (as a slave processing unit under the control of another master processing unit), then the operation of the processing unit is in an embodiment configured accordingly. For example, any functional units that are redundant in a "slave" processing unit (such as a tiler unit, management unit, and/or a memory management unit of the slave processing unit) are in an embodiment made inactive when a processing unit is configured to operate as a "slave".

Where there is a linked set of processing units comprising one processing unit acting as a master processing unit for the linked set of processing units and one or more other processing units acting as slave processing units in the linked set of processing units, then the linked set of processing units will, and in an embodiment do, communicate with each other via (over) the appropriate communications bridge(s) between and connecting the processing units.

In the case of a linked set of two processing units, the processing units will communicate via the (single) communications bridge that connects them. For linked sets of more than two processing units, the processing units will communicate over plural communications bridges connecting the processing units. In this case, the plural (3 or more) processing units are in an embodiment connected in a "daisy-chain" arrangement (in series), i.e. with communications bridges connecting the processing units effectively as a linear sequence of the processing units.

Thus, in an embodiment, where a processing unit is operating as a master processing unit controlling two or more slave processing units, the master processing unit is directly connected to one of the slave processing units via the appropriate communications bridge but controls and communicates with the other slave processing unit(s) via respective other slave processing units (such that the master will control and communicate with one or more slave processing units via a "daisy-chain" of one or more other slave processing units).

Correspondingly, a slave processing unit will communicate with the master processing unit directly where the master processing is directly connected via a communications bridge to the slave processing unit, or it will communicate with the master processing unit via one or more other (slave) processing units in a daisy-chain type arrangement.

Similarly, for communications between slave processing units, a slave processing unit will communicate with another slave processing unit directly where the other slave processing is directly connected via a communications bridge to the slave processing unit, or it will communicate with the other slave processing unit via one or more other (slave) processing units in a daisy-chain type arrangement.

In an embodiment, a processing unit can only control, i.e. act as a master for, processing units that follow it in the "daisy-chain" sequence. Correspondingly, a processing unit can in an embodiment only be controlled by, i.e. act as a slave for, processing units that precede it in the "daisy-chain" sequence. The arrangement is in an embodiment such that a processing unit can only control (i.e. act as a master for) a contiguous set of one or more other processing units, e.g. and in an embodiment, that immediately follow the processing unit in the "daisy-chain" sequence (and that are each acting as slave).

Thus in an embodiment, a (and in an embodiment each) set of plural processing units that are generating a data processing output in combination with each other is a set of contiguous processing units (in a "daisy-chain" sequence) (in series).

It will be appreciated from the above that sending a communication over a sequence of at least three connected processing units via communications bridges linking the processing units will in an embodiment comprise:

sending the communication from an internal communications network node of a first processing unit of the sequence of connected processing units to an internal communications network node of a second processing unit of the sequence that has a different position in the internal communications network routing sequence order of the internal communications network nodes in the second processing unit to the position in the internal communications network routing sequence order of the internal communications network nodes of the internal communications network node in the first processing unit; and sending the communication from the internal communications network node of the second processing unit of the sequence of connected processing units to an internal communications network node of a third processing unit of the sequence that has a different position in the internal communications network routing sequence order of the internal communications network nodes in the third processing unit to the position in the internal communications network routing sequence order of the internal communications network nodes of the internal communications network node in the second processing unit (and so on for more processing units in the sequence of connected processing units (if any)).

Similarly, sending a communication over a sequence of at least three connected processing units via communications bridges linking the processing units will in an embodiment comprise:

sending the communication from an internal communications network node associated with a functional unit of a first type of a first processing unit of the sequence of connected processing units to an internal communications network node associated with a functional unit of a second, different type of a second processing unit of the sequence; and sending the communication from the internal communications network node associated with a functional unit of the second processing unit of the sequence of connected processing units to an internal communications network node associated with a functional unit of a different type to the second different type of a third processing unit of the sequence of connected processing units (and so on for more processing units in the sequence (if any)).

In this case, in an embodiment, the functional unit of the first and third processing units is a cache and the functional unit of the second processing unit is other than a cache, or the functional units of the first and third processing units are other than a cache and the functional unit of the second processing unit is a cache (and so on for more processing units in the sequence (if any)).

It will be appreciated from the above, that at least in the case where a set of plural processing units are linked in series via respective communications bridges between the processing units, then which connection (link) of each respective communications bridge a communication from one processing unit to another processing unit in the linked sequence processing units will use will be dependent upon the position of the processing unit in the linked sequence of processing units and the position of the communication source in the internal network routing sequence order for the processing unit in question (which will thereby, as discussed above, determine which link of the plural (e.g. two) communications connections (links) provided by the communications bridges communications from that functional unit will use when "exiting" the processing unit to a connected processing unit via the communications bridge).

Thus, for example, and in an embodiment, the arrangement will be, and is in an embodiment, such that the communications from sources (e.g. functional units) having the same relative network position routing to the communications bridge in immediately adjacent processing units in a sequence of linked processing units will follow different communications paths (use different ones of the respective pairs of connections provided by the communications bridges) when travelling along the sequence of connected (linked) processing units.

This will then have the effect of distributing similar communications traffic (e.g. memory transactions) from different (e.g. adjacent) processing units in a sequence of linked processing units along different communications paths linking the processing units in the sequence, thereby, in effect, causing that traffic to be distributed over all the available communications paths and so thereby reducing bottlenecks in the communications paths.

The processing units can be configured as the desired subsets (partitions) (linked sets) of the processing units in any suitable and desired manner. In an embodiment, this is done by appropriately setting the internal communications networks of the processing units, and the ability (or otherwise) of the processing unit(s) to communicate with other processing unit(s) via the communications bridges (so as to allow communication relevant to the required operating mode for the processing unit or units of the subset (partition) in question (and to prevent communication that would be inappropriate for the operating mode in question and/or appropriate for another operating mode)).

Thus, for example, where a processing unit is in a partition of "one", and so is to act in standalone mode, any communication to other processing units via a communications bridge or bridges of the processing unit should be, and is in an embodiment, disabled (prevented). Correspondingly, where a processing unit is to act as a master or slave processing unit (i.e. is in a partition of more than one processing unit), then communication over the communication bridges of the processing unit and its corresponding slave or master processing units should be, and is in an embodiment, enabled and configured accordingly.

This may be done, for example, and in an embodiment, by setting one or more switches controlling the internal communications network(s) of the processing unit(s) and/or the communication bridges to other processing units of the plurality of processing units appropriately.

As well as the configuring the appropriate communications for the processing units to form the desired subsets (partitions) of the processing units, the configuration of the processing units into the desired subsets (partitions) may, and in an embodiment does, also comprise configuring the operation of the processing units appropriately as well (e.g. for standalone, master or slave operation, as discussed above).

The processing units are in an embodiment configured into the desired sets (partitions) of the processing units by a controller of the data processing system. That controller can take any suitable and desired form. It is in an embodiment an appropriate software controller of the data processing system, e.g. and in an embodiment, that is executing on an appropriate processor, such as a CPU, of the data processing system (and that is separate to the processing units themselves).

In an embodiment, the controller is a controller that is also operable to control access to the processing unit(s), e.g. by virtual machines that require processing operations by the processing unit(s).

The controller can operate to configure the processing units into the respective sets of processing unit(s) in any suitable and desired manner.

In an embodiment, the processing units have an associated management circuit that is operable to configure the processing units into different sets (under the control of the controller) (e.g., and in an embodiment, by appropriately setting the internal communication networks of the processing units, and the ability (or otherwise) of the processing unit(s) to communicate with other processing unit(s) via the communications bridges), and the controller correspondingly controls the processing unit management circuit to allocate and configure the processing units into the desired sets of the processing unit(s).

The controller can control the management circuit to perform the desired configuration of the sets of processing unit(s), etc., in any suitable and desired manner. In an embodiment, the management circuit includes an independent, e.g., and in an embodiment, only accessible by suitable software, configuration interface that is accessible to (and in an embodiment only accessible to) the controller for this purpose. This interface may comprise, for example, a set of configuration registers for setting parameters to control the management circuit to configure the processing units.

In an embodiment, the sets of processing unit(s) can be reconfigured in use, for example in response to some event that may be detected and conveyed to the data processing system and the controller. In this case, a given processing unit and/or set of processing units is in an embodiment reset and/or powered off (and then restarted) when it is reconfigured.

As discussed above, in an embodiment, each processing unit has a cache (and in an embodiment a level 2 cache). In that case, when plural processing units are linked to form a set of linked processing units with a master processing unit and one or more slave processing units, then the combined set of linked processing units will contain multiple, e.g. level 2, caches. In such an arrangement, in an embodiment, different caches are used for different addresses (cache lines) (address ranges), as this may make the use of the multiple caches more efficient.

Thus, in an embodiment, the routing of data to the caches of the processing units is configured such that: when a processing unit is operating in a standalone mode, in which the processing unit operates independently of the other processing units to perform a processing task, all data to be cached for the processing unit will be stored in the cache of that processing unit; and when two or more of the processing units are operating as a linked set of a master and one or more slave processing units, data to be cached for the set of two or more processing units will be stored in different caches of the caches of the processing units of the linked set of processing units, in an embodiment in dependence on the memory addresses associated with the data.

As discussed above, the internal communications networks of the processing units and the communications bridges connecting the processing units (when enabled) act to route communications (and in an embodiment messages) between functional units both within a given processing unit and in different processing units (where the processing units are linked together).

These communications may, and in an embodiment do, comprise one or both of: control traffic (messages), e.g. from and to a management unit of a processing unit to distribute subtasks to and communicate with the execution units (and other functional units) of the processing unit (and of any other processing unit(s) that the processing unit is acting as a master for); and memory transaction traffic, e.g. from and to execution unit(s) of a processing unit and a cache or caches of the processing unit or any linked processing unit.

These communications can be routed to and from the functional units over the network(s) and bridge(s) in any suitable and desired manner. In an embodiment, this is done using a suitable addressing arrangement that allows communications (messages) to and from the different functional units to be appropriately indicated and identified.

A communication, e.g. message, to be sent to a functional unit in an embodiment then includes with it the address of the target (destination) functional unit (of the node associated with that functional unit), and the communications (messages) are passed along the nodes of the internal communications networks of the processing units in sequence, with each node comparing the target address to its address, and then forwarding the communication (message) to an adjacent node (in the communications network routing sequence order), or "receiving" the communication (message) itself (by passing the communication (message) to its associated functional unit) accordingly.

The network nodes are in an embodiment configured either to prioritise forwarding a communication (message) that is not for them on to the next node along the internal communications network (i.e. to the next node in the processing unit in question), or to prioritise forwarding a communication (message) that is not for them over a communications bridge connection to a node in another (linked)

processing unit. This will help to route communications efficiently where there is a set of linked processing units.

Thus, in an embodiment, one or more of the network nodes of a (and in an embodiment of each) processing unit are configured to prioritise forwarding a communication (message) that is not for them on to the next node along the internal communications network (i.e. to the next node in the processing unit in question) and one or more other (different) network nodes of the processing unit are configured to prioritise forwarding a communication (message) that is not for them over a communications bridge connection to a network node in another (linked) processing unit.

In an embodiment, those network nodes (e.g. the nodes for the caches) that are connected by a communications bridge connection are configured to prioritise forwarding a communication (message) that is not for them over the communications bridge connection to a node in another (linked) processing unit, and those nodes that are not connected by a communications bridge connection are configured to prioritise forwarding a communication (message) that is not for them on to the next node along the internal communications network (within the processing unit in question).

In these arrangements, a node will forward a communication (message) that is not for it in the "priority" direction where the communication (message) needs to be forwarded in that direction to reach its destination, but will forward the message in the non-priority direction otherwise.

In an embodiment, a communications network topology dependent addressing arrangement is used for communications between the network nodes of the processing units. In an embodiment an addressing arrangement in which the nodes of the processing units are considered to be arranged on an (X, Y) grid, with respective nodes then being addressed by their appropriate X, Y coordinate on the grid, is used for communications between the nodes of the processing units.

A communication (message) to be sent to a functional unit in an embodiment then includes with it the address of the target (destination) functional unit in terms of the X, Y coordinate where the target functional unit is located, and the communications (messages) are passed to the nodes over the internal communications networks of the processing units in sequence, with each node comparing the target X, Y coordinate to its X, Y coordinate, and then forwarding the communication (message) to an adjacent node, or "receiving" the communication (message) itself, accordingly.

In this case, nodes will in an embodiment operate as "X-priority" (i.e. prioritise forwarding communications in the X direction) or "Y-priority" (i.e. prioritise forwarding communications in the Y direction), as appropriate.

In an embodiment, the nodes (and thus the functional units) within a processing unit are considered to lie along one axis of the grid (e.g. the Y axis) and so will have progressively increasing coordinates along that axis, with the processing units being considered to lie along the other axis of the grid (e.g. the X axis) (and so each processing unit will have a different, e.g. X, coordinate along that axis).

Correspondingly, in this case, the nodes of a processing unit that are connected by a communications bridge will have different coordinates to each other along the axis for the nodes within the processing unit (e.g. different Y coordinates), and each connection of a communications bridge will connect a node in one processing unit to a node in the other, connected processing unit having a different position (coordinate) along that axis.

Thus in the case where the nodes within a processing unit are considered to lie along the Y axis, each connection of a communications bridge will connect two nodes having different Y coordinates. For example, one connection will connect the node having the coordinate n along the Y axis in one of the connected processing units to a node having a coordinate n+1 along the Y axis in the other connected processing unit, and the other connection of the communications bridge will, for example, connect the node having the Y coordinate n+1 in the first processing unit to the node having the Y coordinate n in the second processing unit. In other words, each communications bridge connection between the processing units will be unaligned along the axis in question (unaligned along the Y coordinate).

It would also be possible in this regard for one or more (and in an embodiment all) of the processing units to have two or more columns (or rows) of nodes (functional units) in its internal network topology with each column having the different X coordinate (or a different Y coordinate, as appropriate), as well as the individual processing units having different X (or Y) coordinates. In this case therefore, communications (messages) may also be routed in the, e.g. X direction, within a processing unit, as well as being routed in that direction between different processing units.

Other addressing arrangements would, of course, be possible.

In an embodiment, each functional unit and/or node also has a in an embodiment unique (at least for the current configuration of the processing units) system address (that is in an embodiment not network topology dependent). In an embodiment, this address is used to identify a target functional unit, and then converted to the "network topology", e.g. X, Y coordinate, address for sending the message. This conversion can be done, e.g., and in an embodiment using a, in an embodiment predefined, set of address mappings between the "system" addresses and "network" addresses (e.g., and in an embodiment, in a look up table).

As discussed above, it is envisaged that the arrangement of the internal communications networks and the communications bridges of the technology described herein will have particular application to memory transactions passing between execution units of the processing units and caches of the processing units, such as cache requests from the execution units and the responses (both control signals, such as acknowledgments, and the required data itself) from the caches.

It may also be used particularly for communications between a management unit of a master processing unit and functional units of slave processing units, such as to distribute subtasks for processing to execution units of the master processing unit and of one or more of the slave processing units that it is controlling and linked to. In this case, the slave processing units will receive the relevant subtasks for processing from the master processing unit, process those tasks and return their results accordingly. The execution units on the slave processing units may, e.g., signal the management unit on the master processing unit when they have completed their tasks, via the relevant communication bridges, in a similar way to the way that the execution units on the master processing unit will signal the management unit on completion of their tasks.

As well as the arrangement of the internal communications networks and the communications bridges of the technology described herein discussed above, the processing units and the data processing system may, and in an embodiment does, include one or other communications networks, e.g., and in an embodiment, for other communications that may need to be routed within and between the processing units. For example, there may be a separate network (directly) linking the management units of each processing unit.

As well as the processing units, communications bridges, etc., necessary for operation in the manner of the technology described herein, the data processing system may otherwise include any other suitable and desired components, elements, units, etc., that a data processing system may comprise.

Thus, in an embodiment, the data processing system includes the processing units, and one or more host data processing units (processors) (e.g. central processing units) on which one or more virtual machines and/or applications that are to use the processing units execute, in an embodiment together with one or more drivers for the processing units. As discussed above, one or more of the host processors in an embodiment also executes a controller that is operable to partition the processing units into subsets of the processing units, and/or that is operable to control access to processing units (and in an embodiment to the partitions of the processing units) by respective virtual machines/applications.

In an embodiment, the data processing system and/or processing units comprise, and/or are in communication with, one or more memories and/or memory devices that store the data described herein, and/or that store software for performing the processes described herein.

The data processing system may also include one or more peripheral devices, such as one or more output devices (e.g. display screens, vehicle controllers, etc.), and/or one or more input devices (e.g. human-computer interfaces, vehicle sensors, etc.).

The technology described herein can be used for all forms of output that data processing units may output. Thus, in the case of graphics processing units, it may be used when generating frames for display, render-to-texture outputs, etc. However, the technology described herein can equally be used where the graphics processing units are to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor(s), a computer program element comprising computer software code portions for performing the methods herein described when the program element is run on a data processor(s), and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor(s) causes in conjunction with said data processor(s) said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an embodiment of a data processing system in the form of an automotive system-on-chip (SoC).

As shown in FIG. 1, the data processing system 1 of this embodiment comprises three CPU (central processing unit) clusters: a first "quality managed" (QM) cluster 2, comprising a CPU 3 running "quality managed" software (thus the CPU 3 does not have automotive safety features); a second, "ASIL" (automotive safety integrity level) (functional safety, FuSa) cluster 4, comprising a CPU 5, but this time running appropriately safety certified software; and a "safety island" cluster 6, comprising a CPU 7 that runs safety certified software for configuration of the system and fault handling.

As shown in FIG. 1, each CPU cluster also comprises its own general interrupt controller (GIC) 8, 9, 21.

As well as the CPU clusters, the system also comprises a "graphics processing" cluster 10, comprising a set 11 of graphics processing units ("slices"), that are able, as will be discussed further below, to provide processing functions to virtual machines executing on the QM cluster 2 and the ASIL cluster 4.

In this example, the set 11 of graphics processing units comprises eight graphics processing units (slices 0-7, where each slice is a graphics processing unit of the set), but other numbers of graphics processing units would, of course, be possible. As will be discussed further below, in this embodiment the graphics processing units (GPUs) can be operated in various modes, namely either as "standalone" GPUs, or as one or more linked sets of a primary (master) and one or more secondary (slave) GPUs.

The graphics processing units 11 also have associated with them (as part of the graphics processing cluster 10), a management circuit (partition manager) 12.

As shown in FIG. 1, the system supports three separate communications bus connections for the graphics processing cluster 10: a first communications bus 18 that may be used, for example, for non-safety critical traffic and thus by the QM cluster 2; a second bus 19 that may be a safety-critical/secure bus and used, for example, for safety critical traffic and thus by the ASIL cluster 4; and a third bus 20 that may be a safety-critical/secure bus but that also has privilege restrictions (i.e. can only be accessed by appropriately privileged bus masters) and that is used for configuration communications only by the safety island 6.

The system also includes an appropriate system cache 13, DRAM controller 14, interconnects 15, 16 and a system memory management unit (sMMU) 17 (that, e.g., provides second level address translation separating safe and non-safe address spaces and isolates the memory access for each virtual machine based on the per-access window stream IDs) for the graphics processing cluster 10.

There may, of course, be functional units, processors, system elements and components etc., that are not shown in FIG. 1.

The management circuit (partition manager) 12 for the graphics processing units 11 is operable to configure and set a configurable communications network that sets the communications paths between the different graphics processing units (slices) 11, and also how the (and which) graphics processing units communicate with the QM cluster 2 and the ASIL cluster 4 (and in particular which of the buses 18, 19, can be used to communicate with the respective graphics processing units). In particular, it can set that communications network to configure the graphics processing units (slices) 11 into, in this embodiment, two different groups of the graphics processing units, one group for the QM cluster 2 (and coupled to the bus 18 for that cluster), and one group for the ASIL cluster 4 (and coupled to the bus 19 for that cluster).

As well as being able to set the configurable communications network to subdivide the graphics processing units into different groups, the management circuit (partition manager) also supports and can configure the organisation of the graphics processing units of a group into one or more independently allocatable partitions (subsets) of the graphics processing units (slices) of the group.

The management circuit (partition manager) 12 also provides a set of "access windows" in the form of communications interfaces whereby a virtual machine may access and control a given partition of the graphics processing units. Each such access window comprises, in the present embodiments, a set of (communication) registers having a corresponding set of physical addresses that can be used to address those registers.

These access windows also provide the mechanism whereby a virtual machine may communicate with an arbiter (with the arbiter for the group of graphics processing units that the virtual machine is to used), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition. The virtual machine-arbiter interface is separate to the virtual machine-graphics processing unit partition interface.

Thus, the graphics processing cluster 10 effectively provides a set of graphics processing resources, comprising the graphics processing units (slices) 11, and the partitions and access windows supported by the management circuit 12, which resources can be subdivided into plural (in the present embodiment two) graphics processing resource "groups", each containing one or more of the graphics processing units (slices) and having associated with them one or more of the independently allocatable partitions of the graphics processing units and one or more "access windows".

In the present embodiment, the management circuit (partition manager) 12 supports the subdivision of the graphics processing units 11 into two different groups (one for use by the QM cluster 2, and the other for use by the ASIL cluster 4), into a maximum of four partitions, and provides a set of 16 access windows for virtual machines to communicate with the partitions of the graphics processing units. Other arrangements would, of course, be possible.

In the present embodiments, the configuration of these graphics processing resources into the respective groups is done by the management circuit (partition manager) 12 under the control of a (privileged) controller executing on the safety island 6, and respective arbiters executing on the QM cluster 2 and the ASIL cluster 4.

To support this operation, the management circuit (partition manager) 12 further comprises appropriate configuration interfaces, e.g., and in an embodiment, in the form of appropriate sets of configuration registers, that can be respectively accessed and set by the controller on the safety island 6 and the arbiters on the CPU clusters. The controller and arbiters can correspondingly set their configuration registers accordingly, to thereby control the management circuit (partition manager) 12 to configure the graphics processing resources (and in particular the configurable communications network that configures the graphics processing resources) accordingly. The management circuit (partition manager) 12 may also include one or more state machines for this purpose.

Figure 2:
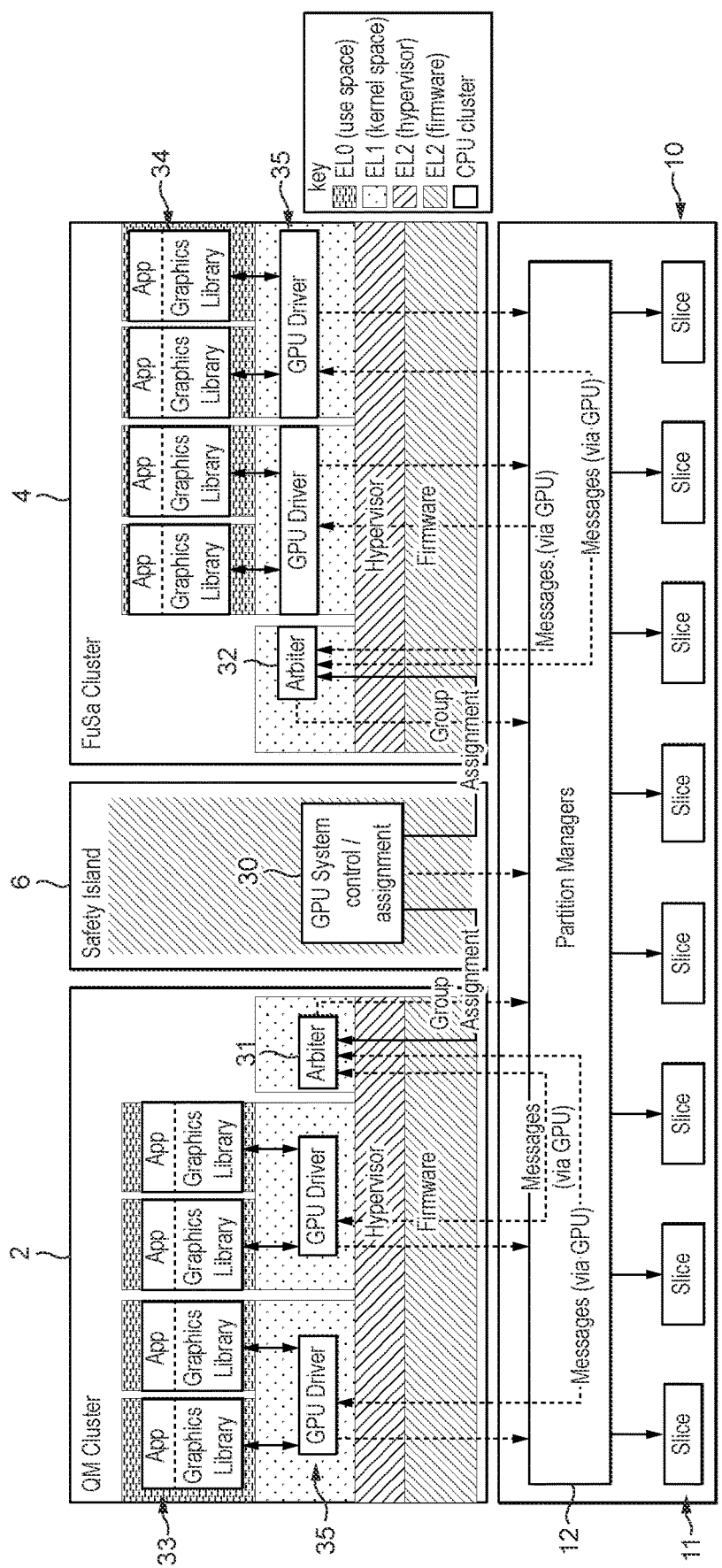
FIG. 2 shows schematically further details of the data processing system of FIG. 1.

FIG. 2 illustrates this, and shows the QM cluster 2, ASIL (FuSa) cluster 4, and safety island 6, together with a (privileged) system controller 30 executing on the safety island 6, an arbiter 31 executing on the QM cluster 2, and an arbiter 32 executing on the ASIL (FuSa) cluster 4.

The arbiters 31, 32 are operable to control access by virtual machines executing on the respective clusters to the corresponding graphics processing resource group that has been allocated to that cluster. The arbiter 32 for the ASIL cluster 4 is configured to operate in and supports operation in an appropriate safety critical manner. The arbiter 31 for the QM cluster does not need to be configured to operate and support safety critical operation.

Each arbiter may operate in association with a corresponding hypervisor for managing the operation of virtual machines that is executing on the cluster in question (but is separate to the hypervisor).

FIG. 2 also shows a corresponding set of virtual machines 33 executing on the QM cluster 2, and a set of virtual machines 34 executing on the ASIL cluster 4. In this example, it is assumed that there are two virtual machines executing on each cluster, although other arrangements would, of course, be possible. Each cluster correspondingly executes an appropriate graphics processing unit (GPU) driver 35 for each virtual machine that it supports.

FIG. 2 also shows the corresponding communications links between the controller 30 and arbiters 31, 32, and from the controller 30 and arbiters 31, 32 and virtual machines 33, 34 (via the drivers 35) to the management circuit (partition manager) 12 of the graphics processing unit cluster 10.

The controller 30 is able to assign to each "resource group" that it configures, one or more graphics processing units of the set of graphics processing units 10, one or more of the partitions that the partition manager 11 supports, and one or more of the access windows that the partition manager supports. Each group is also assigned to a respective one of the "cluster" communication buses 18 and 19, in dependence upon whether the group is to be used by the QM cluster 2 (in which case it will be assigned to the corresponding QM cluster bus 18) or by the ASIL cluster 4 (in which case it will be assigned to the ASIL bus 19).

In order to configure the respective groups of graphics processing resources that are to be made available to the QM cluster 2 and ASIL cluster 4, the controller 30 on the safety island 6 sets appropriate configuration parameters in the (privilege-restricted) configuration registers of the management circuit (partition manager) 12, in response to which the management circuit 12 configures the communications network for the graphics processing unit (slices) 11 accordingly. As shown in FIGS. 1 and 2, the controller 30 communicates with the management circuit (partition manager) 12 directly, via the restricted configuration bus 20.

As will be appreciated from the above, in this embodiment of the technology described herein, the graphics processing units and their associated management circuit can, in effect, be considered to be divided into three different "safety" domains, a "control" safety domain 50, comprising the main configuration control of the management circuit 12, that is owned and controlled by the "safety island" CPU cluster 6, and then two further domains, comprising a "safety critical" domain 51 that comprises a group of graphics processing resources being used by and owned by the "safety critical" ASIL CPU cluster 4, and a second, "non-safety critical" domain 52 comprising a group of graphics processing units, etc., that is to be used, and owned by the QM CPU cluster 2.

Figure 3:
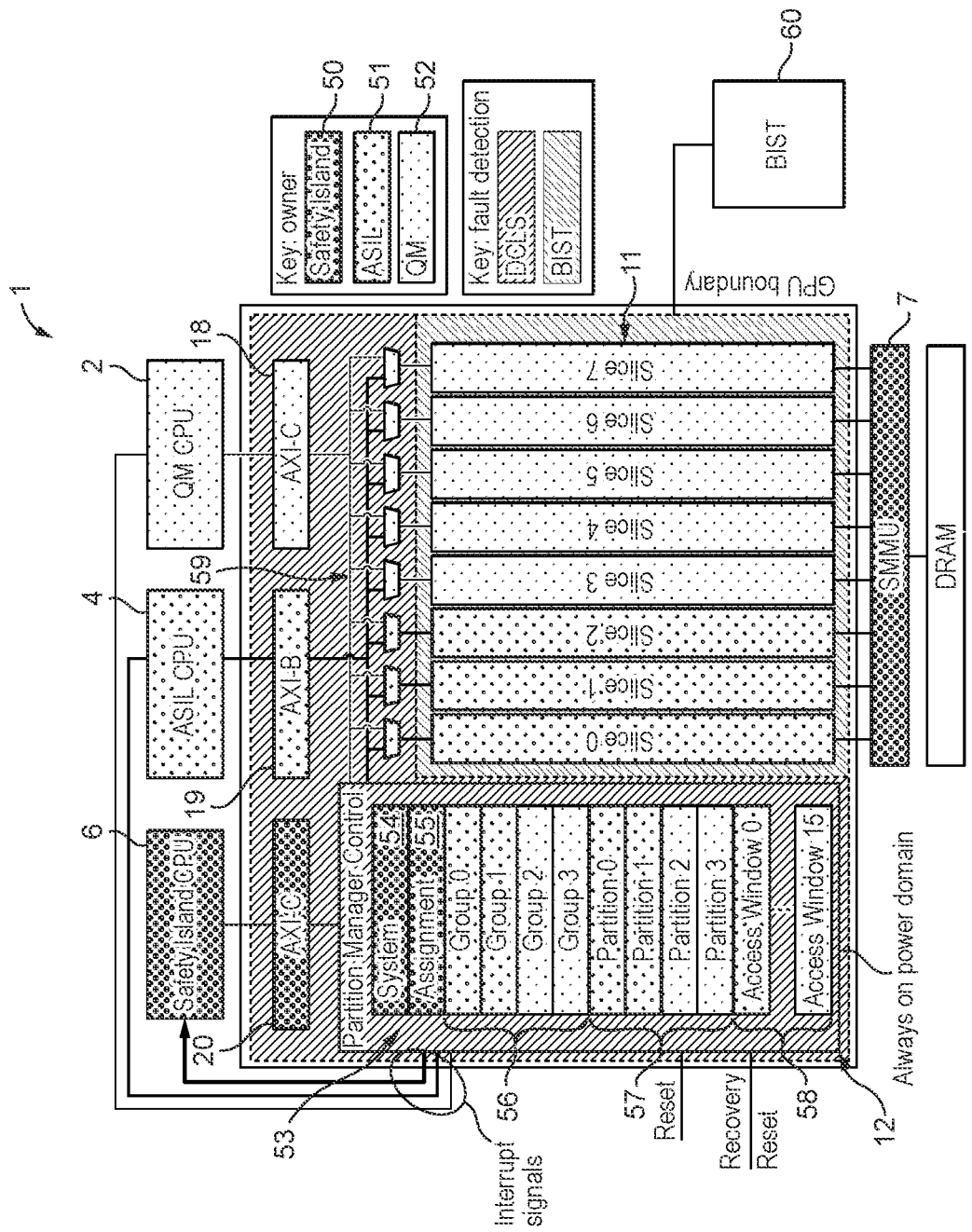
FIG. 3 shows schematically further details of the data processing system of FIGS. 1 and 2.

FIG. 3 illustrates this and shows in more detail the arrangement of the management circuit and the distribution of the "ownership" of different aspects of the management circuit and the graphics processing units between the different domains.

As shown in FIG. 3, the management circuit (partition manager) 12 includes, inter alia, a set of control interfaces (communications interfaces) 53 that may be used to control the management circuit to configure the groups of graphics processing resources, and then to use the resources in the groups. These control (communications) interfaces comprise respective address spaces and sets of registers that can be addressed by appropriate software executing on the processors (processor clusters).

These control interfaces comprise firstly a "system" interface 54 that comprises a set of control registers that may be used, for example, to set system parameters, such as the stream IDs to be used for respective access windows.

The system interface 54 may also be used (by the controller 30) to configure the fault protection and detection settings (operation), such as enabling the desired fault detection mechanisms (and their interrupts), enabling fault detection for the desired groups, partitions and graphics processing units, and/or configuring the behaviour in the event of a fault (e.g. whether fault reporting is enabled or disabled, the current operation should be terminated or continued, etc.).

There is then an "assignment" interface 55, which is used by the controller 30 on the safety island CPU cluster 6 to set the allocation of resources (so graphics processing units (slices), partitions and access windows) to the respective groups, and the allocation of the groups to the respective communications buses.

As shown in FIG. 3, these interfaces 54, 55 of the management circuit are used by and belong to the controller 30 on the safety island processor cluster 6, and are accessed via (and only accessible via) the corresponding privileged bus 20 for communicating with the safety island CPU cluster 6.

The management circuit 12 then further includes a set of "group" configuration interfaces 56, which can be used by the arbiters for the respective groups to configure the resources within the group, and in particular to configure and set up the allocation of graphics processing units and access windows to respective partitions within the groups.

As shown in FIG. 3, these group configuration interfaces are accessible to and will be accessed by the respective arbiters to which the groups have been assigned, via the corresponding communications bus for the processor cluster that the arbiter is executing on.

In the example shown in FIG. 3, it is assumed that groups 0 and 1, partitions 0 and 1, graphics processing units (slices) 0-2 and an appropriate set of access windows have been assigned to the ASIL CPU cluster 4, and so will be controlled by the corresponding arbiter 32 for that cluster via the ASIL cluster communications bus 19.

Correspondingly, groups 2-3, partitions 2-3, graphics processing units 3-7 and a suitable set of access windows have been assigned to the QM cluster 2, and so will be controlled by the arbiter 31 for that cluster over the QM cluster bus 20.

Other distributions of the resources into groups (and thus as between the CPU clusters) could be used if desired.

As well as the group configuration interfaces 56, the management circuit also provides a set of partition control interfaces 57, which may be used by the arbiter for the group of graphics processing units that the partition belongs to to, inter alia, power a partition on and off, reset the partition, and, also, and as will be discussed further below, trigger fault detection testing for the partition in question.

The management circuit 12 then finally provides, as discussed above, a set of access windows 58, to provide the communication and control interface whereby a virtual machine may access and control a partition of a group of graphics processing units that it has been allowed access to. As discussed above, the access windows also provide an appropriate message passing interface for communications between the arbiter and the virtual machine that the access window belongs to.

FIG. 3 also shows the configurable communications network 59 of the management circuit that, as discussed above, can be set under the control of the controller on the safety island 6 to configure the graphics processing units into the respective groups, and to be coupled to the appropriate one of the communication buses 19, 20, etc.

The management circuit is connected to, as discussed above, three separate communications buses that can be used to communicate with the management circuit and the graphics processing units, namely a privilege-restricted bus 20 for communicating with the safety island CPU cluster 6, a bus 19 for communicating with ASIL CPU cluster 4 and a bus 20 for communicating with the QM CPU cluster 2.

In order to further support and facilitate separation between the hardware of different groups of graphics processing units (and thus the different domains), the management circuit 12 is able to power respective partitions of graphics processing units, and individual graphics processing units within a partition of graphics processing units, on and off independently of each other, and, correspondingly, can reset a partition of graphics processing units (and individual graphics processing units within a partition), independently of each other. This is done under the control of the arbiter for the group of graphics processing units in question, via the corresponding partition interface 57.

On the other hand, as shown in FIG. 3, the management circuit itself is always powered on (and may only be powered off under the control of the system controller 30 on the safety island CPU 6). Correspondingly, the management circuit can only be reset by the system controller 30 on the safety island CPU 6. As shown in FIG. 3, in this embodiment there are two levels of "reset" that can be applied to the management circuit, a first "reset" that resets all hardware, and a second "recovery reset" that resets all hardware except for error reporting mechanisms (which may, e.g., be used when error recovery requires a reset (e.g. because a unit is unresponsive)).

Also, as shown in FIG. 3, each CPU cluster has its own, independent interrupt. In this embodiment, both the management circuit, and each partition of graphics processing units, can generate its own, independent interrupt. The interrupts are broadcast to all of the CPU clusters of the system, with the corresponding interrupt controller for each CPU cluster identifying whether the broadcast interrupt applies to it or not (is for a partition of a group of graphics units that is under its ownership in the case of the ASIL CPU cluster 4 and the QM CPU cluster 2, or is from the management circuit in the case of the safety island CPU cluster 6).

In the present embodiment, in order to further support the operation of the groups of graphics processing units in separate, "safety critical" and "non-safety critical" domains, and under the control of a "safety island" domain, the system further supports and uses appropriate fault protection mechanisms for the management circuit 12 and the graphics processing units 11.

In particular, the management circuit is permanently operated at a higher (high) level of fault protection, in this embodiment by being always and permanently subjected to a fault detection process (monitoring). This is achieved in the present embodiment by protecting the management circuit using a dual core lockstep fault detection mechanism, i.e. the management circuit is instanced twice, with one instance of the management circuit being used to check the operation of the other instance of the management circuit at all times (and such that if there is any discrepancy between them, that will be taken as indicating a fault).

The graphics processing units, on the other hand, are not protected by dual-core lockstep, but are instead able to be protected against faults using built-in self-testing (BIST). In the present embodiment, this built-in self-testing can be selectively triggered for a graphics processing unit, under the control of the arbiter for the group of graphics processing units that the graphics processing unit belongs to. In particular, as discussed above, the arbiter can use the partition control interfaces 57 to trigger BIST fault detection testing for a partition.

As shown in FIG. 3, in order to support the use of BIST fault detection testing for the graphics processing units, the data processing system further comprises an appropriately configured BIST unit (circuit) 60. Thus when the arbiter for a group of graphics processing units indicates that a graphics processing unit should undergo a built-in self-test, that test will be performed appropriately for the graphics processing unit in question by the BIST unit.

Figure 4:
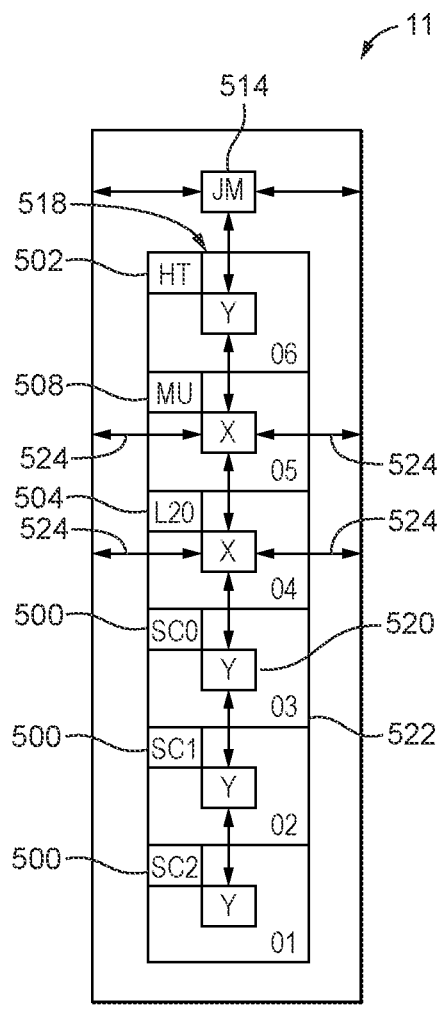
FIG. 4 shows schematically and in more detail components of a graphics processing unit in an embodiment.

FIG. 4 shows in more detail the arrangement and components of each graphics processing unit (slice) 11 in this embodiment.

As shown in FIG. 4, in this embodiment, each graphics processing unit (slice) comprises one or more execution units, such as programmable processing (shader) cores 500 (SC) and a hierarchical tiler 502 (HT). In this embodiment, each graphics processing unit is tile-based. Different graphics processing units 11 may have different sets of execution units, and there are more possible types of execution units than those shown in FIG. 4.

Each graphics processing unit also includes a level 2 cache 504 (L2) that inputs data to be used in the data processing tasks and outputs the resultant output data via a cache interface connected to external system memory via a suitable memory interconnect (not shown). The graphics processing units may also include a memory management unit (MMU) 508, but this may also or instead be located externally to the graphics processing units.

Each graphics processing unit also includes a management unit, in the form of a job manager 514. This provides the software interface for the graphics processing unit 11, and thus receives (via a task interface) tasks (commands and data) for a virtual machine from a driver running on the CPU cluster in question, and divides a task given by the driver into subtasks and distributes the subtasks for execution to the various execution units (shader cores 500, tiler 502) of the graphics processing unit. Where a graphics processing unit 11 is able to operate as a master, the job manager 514 is configured to also be able to control execution units of linked slave graphics processing units. Correspondingly, for a graphics processing unit 11 that is able to operate as a slave, the job manager 514 is able to be disabled when the graphics processing unit is operating in slave mode.

As shown in FIG. 3, the various functional units, etc., of each graphics processing unit are connected to each other via an asynchronous internal communications network 518 that carries various traffic such as memory transactions between execution units and the level 2 cache 504 (L2), subtask control traffic between the job manager 514 and execution units, and so on.

The internal communications network 518 is configured as a message-based interconnect that uses switches. Each functional unit of the graphics processing unit is associated with a corresponding (switching) node 520 of the network, that is operable either to direct a message to its associated functional unit, or to pass the message on to the next node (to the next functional unit), as appropriate.

As shown in FIG. 4, the message routing and addressing on the internal communications network 518 is based on the network topology (sequence) of the nodes (functional units) of the graphics processing units. Thus each node (functional unit) has its own X, Y coordinate 522, depending on its position in the network (sequence), and is addressable using that X, Y coordinate.

In addition to this network topology dependent addressing arrangement, each functional unit of the graphics processing units also has a unique system address that can be used for communications between the graphics processing units. This system address does not identify where the functional unit is in the overall network, but is able to identify the relevant functional unit uniquely for the configuration of the graphics processing system in question.

When a functional unit (such as a shader core, level 2 cache, tiler, etc.) wants to send a message to another functional unit, it will first use the system address of the target functional unit. That address is then converted to the network topology dependent address of the target functional unit (i.e., to the (X, Y) coordinate address where the functional unit is located). This conversion is done in the present embodiments using a "system" address to "network" address lookup table.

The network topology dependent address ((X, Y) coordinate) for the target functional unit is then included with the message (packet) for the target functional unit and passed from the functional unit that is sending the message to its associated network node (switch). The message is then passed from network node (switch) to network node (switch) in turn based on the X, Y coordinate of the target functional unit address included with the message, until the network node (switch) that is associated with the target functional unit is reached. That node (switch) then passes the message to the target functional unit.

As shown in FIG. 4, each node can be configured to be X-first or Y-first. If a node is configured to be X-first, a message entering that particular node will be directed along the X-axis, if its final X co-ordinate has not been reached. If its final X coordinate has been reached, the message will be directed along Y-axis. A Y-first configured node will do the opposite (i.e. direct messages along their Y co-ordinate first).

When a message reaches its destination co-ordinates, it then "exits" the network to be consumed by the "endpoint" functional unit for the node in question.

As shown in FIG. 4, the internal communications network 518 also has respective pairs of "external" connections 524 to "outside" of the graphics processing unit and includes appropriate switches (not shown) that can be activated to enable or disable communication across these connections. As will be discussed further below, these connections connect to respective communications bridges to allow adjacent graphics processing units to be connected to, and to communicate with, each other, when they are to act as a partition of plural graphics processing units.

The different operating modes of the graphics processing unit (standalone, master and slave modes) are set (enabled and disabled) by configuring the routing of the internal communications network 518 appropriately. Thus, for example, when the graphics processing unit is to operate in standalone mode, the external connections 524 are disabled to prevent communication via (across) the communications bridges. Correspondingly, when a graphics processing unit is to act as a master or slave, one or both sets of external connections are enabled to allow communication with a connected graphics processing unit.

In the present embodiment, the internal communications network 518 is reconfigured by the management circuit (partition manager) 12 through a configuration interface 520 of the graphics processing unit 11. Any routing configuration (or reconfiguration) in an embodiment only happens during reset of the graphics processing unit.

FIG. 4 shows an overview of the graphics processing units according to this embodiment of the technology described herein. However, it should again be noted that FIG. 3 is only schematic and that various components and connections have been omitted from that Figure for the sake of clarity.

Equally, the data processing system and/or graphics processing unit(s) of the present embodiment may include, as appropriate, one or more of the features described in US 2017/0236244, the entire contents of which is incorporated herein by reference, and/or US 2019/0056955, the entire contents of which is incorporated herein by reference.

Figure 5:
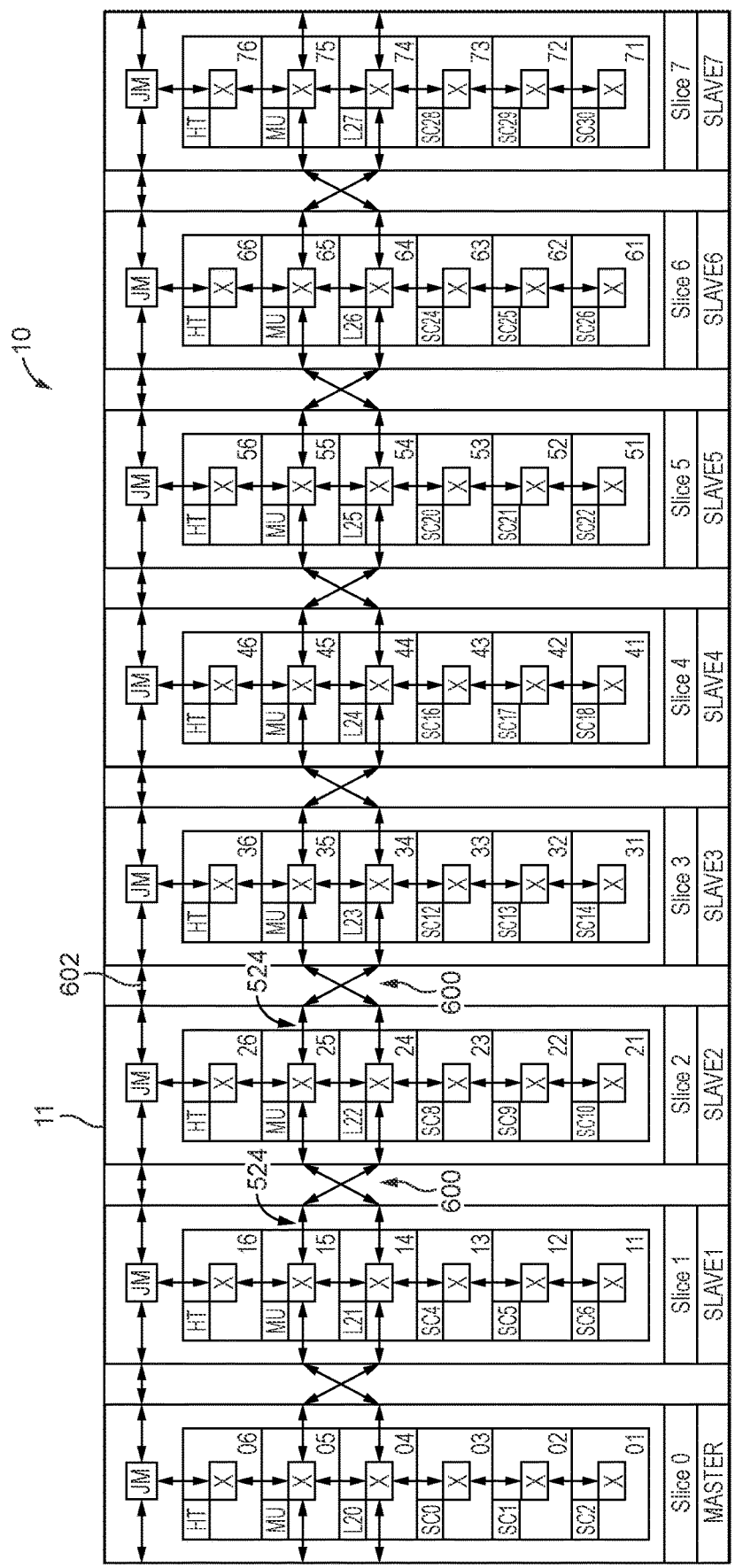
FIG. 5 shows in more detail the communications connections between graphics processing units in an embodiment.

FIG. 5 shows the communication network layout of the graphics processing units (slices) in the graphics processing cluster 10 in the present embodiment in more detail.

As shown in FIG. 5, each graphics processing unit has the layout shown in FIG. 4, and respective pairs of adjacent graphics processing units are connected by means of a communications bridge 600, so that some or all of the graphics processing units 11 can be connected to each other (in the present case, in series, as a daisy-chain).

As shown in FIG. 5, the communication bridges 600 connect the external connections 524 of a graphics processing unit to the external connections 524 of the adjacent graphics processing unit. However, as shown in FIG. 5, the bridges "cross" the connections, i.e. such that an internal network node in one graphics processing unit is connected to an internal network node having a different position in the network routing sequence order in the other graphics processing unit.

Thus, as shown in FIG. 5, the communications bridges 600 connect (the node for) a functional unit in one graphics processing unit to (the node for) a functional unit having a different position in the network routing sequence order in the other graphics processing unit.

In the present case, the cache (the node for the cache) is connected to the MMU (the node for the MMU) (but other linking arrangements would be possible).

As will be discussed further below, the Applicants have recognised that this can lead to increased communication efficiency, particularly when there is a partition of plural graphics processing units operating together.

This arrangement of the technology described herein also lowers any design and verification effort, because the "cross-connection" allows the use of the same network topology in all of the graphics processing units.

Thus, the system uses multiple instances of the GPUs, which are identical and equivalent in functionality, as a basic building block, with GPUs being linked together with the network nodes in rows 4 and 5 (corresponding to the caches and the MMUs) being the interface points between respective GPUs, as shown in FIG. 5. The nodes along rows 4 and 5—{n,4} and {n,5} are configured to be X-first, while all other nodes are configured to be Y-first.

In the present embodiment, the communication bridges 600 are implemented to support an asynchronous interface between graphics processing units, as this allows easier physical implementation of the graphics processing units as the clock can then be independent when the graphics processing units are linked.

It should be noted here that FIG. 5 (and the other Figures) for clarity purposes only show the elements, components, links, etc. of the graphics processing units, etc., that are relevant to the particular operation of the present embodiment that is being described. Thus, for example, as well as the communications bridges 600, there may also be separate bridges 602 and a network linking the job managers of the graphic processing units and other communications links and buses in the system which are not shown in the Figures. For example, each L2 cache will be connected to a system bus, and the job manager of a graphics processing unit will have a (separate) connection to provide the register interface to the host.

The communications bridges 600 allow the graphics processing units 11 to be connected together in partitions of one or more graphics processing units, as discussed above. FIGS. 6, 7, 8 and 9 show some exemplary partition configurations in this regard. (In these Figures the connections 700 between different partitions are shown as being "blocked", as the partitions will be isolated from each other. The communications bridges (and other connections) between graphics processing units include appropriate isolation logic for this purpose, to ensure no cross talk between different partitions in use.)

Figure 6:
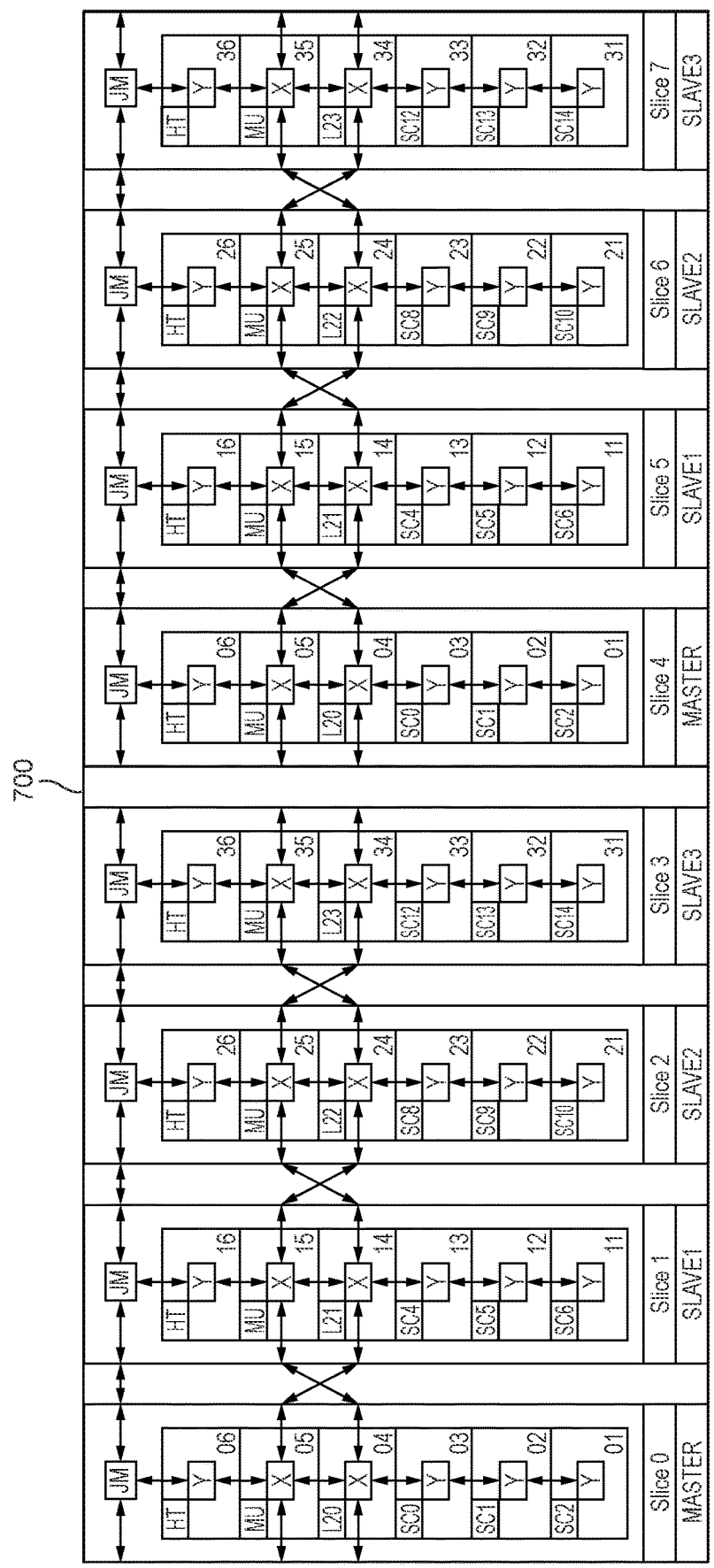
FIGS. 6, 7, 8 and 9 show possible configurations of partitions of graphics processing units in an embodiment.
Figure 7:
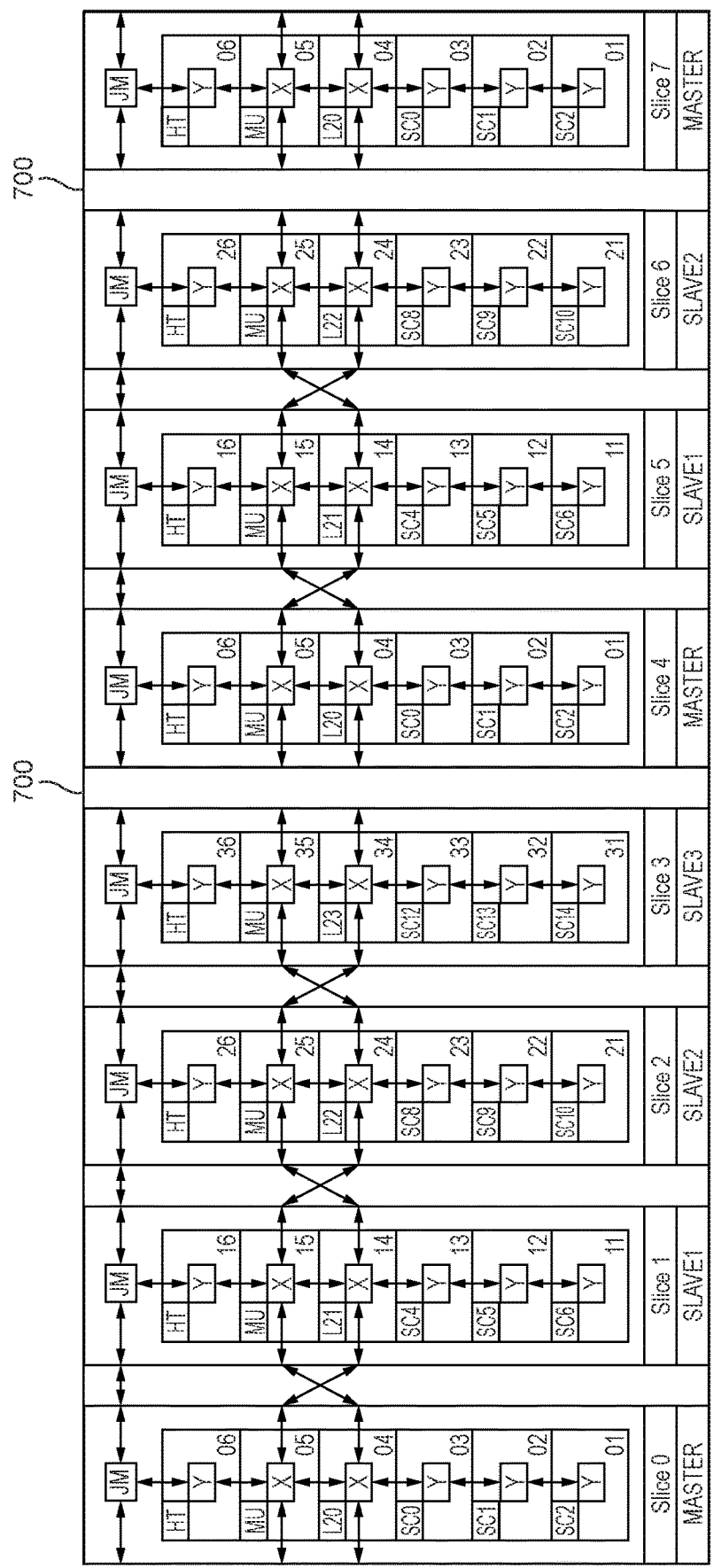
Figure 8:
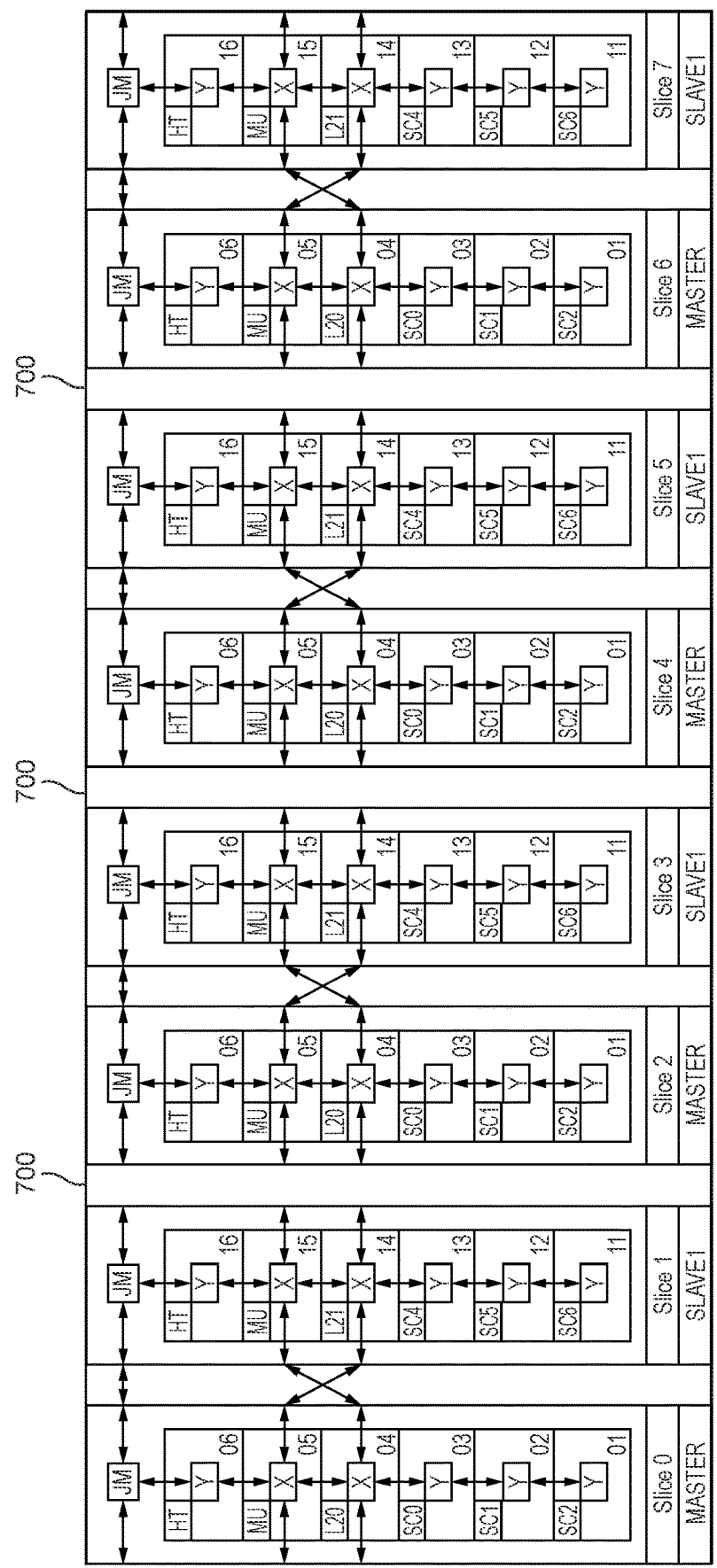
Figure 9:
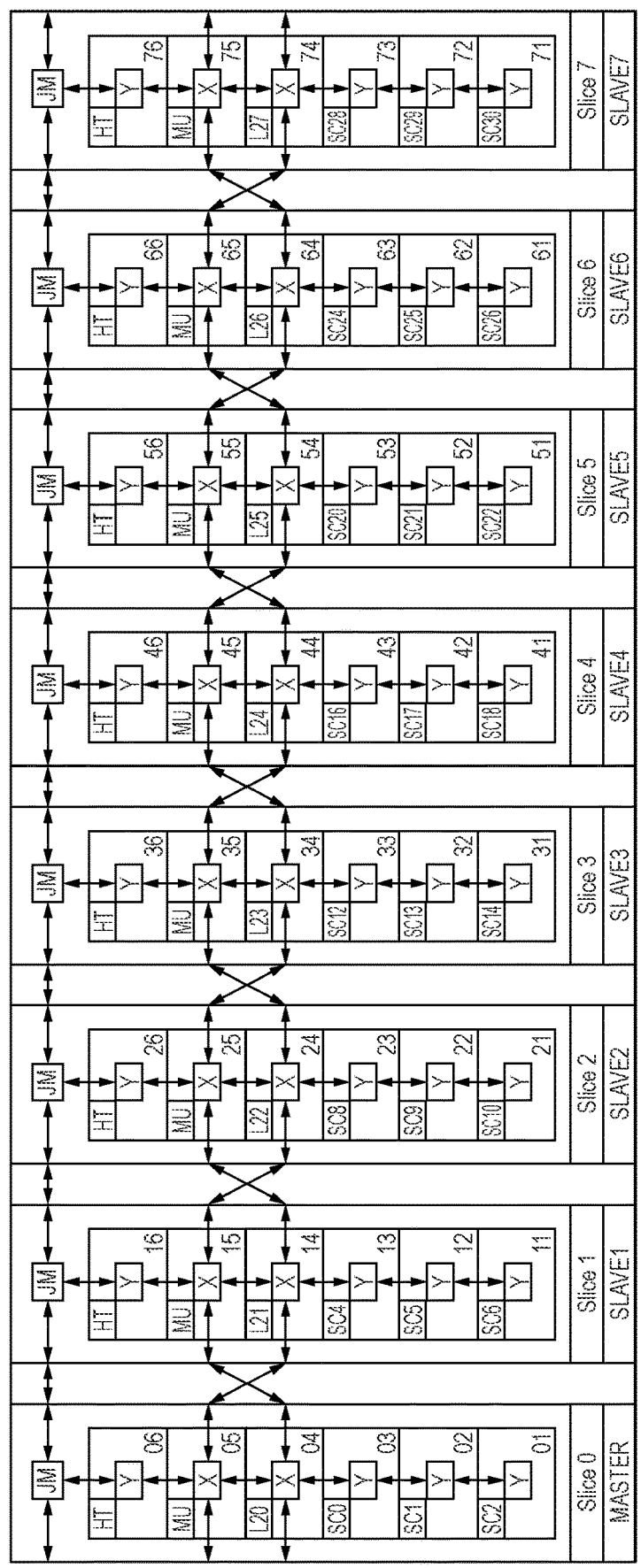

FIG. 6 shows an exemplary configuration having two partitions, each comprising four graphics processing units. FIG. 7 shows an exemplary configuration having three partitions, a four graphics processing unit partition, a three graphics processing unit partition, and a single graphics processing unit partition. FIG. 8 shows an exemplary configuration having four partitions, each comprising two graphics processing units, and FIG. 9 shows an exemplary configuration having a single partition, comprising eight graphics processing units.

As shown in FIGS. 6, 7, 8 and 9, in the present embodiments, when two or more graphics processing units are operating as a linked partition (set) of a master and one or more slave graphics processing units, the tiler, MMU and job manager of the slave graphics processing units are disabled.

Also, the linked plural graphics processing units will contain multiple level 2 caches. To use these more efficiently, in the present embodiments a different level 2 cache is used for different addresses (cache lines). This is achieved in the present embodiments by making the interconnect routing for memory transaction requests from clients to the level 2 cache dependent on a hash of the address. The hash computed is then used to look up the destination level 2 cache for the request in a table. The table content depends on the GPU mode: when the GPU is used in standalone mode all entries in the table point to the internal level 2 cache, but when the GPU is part of a larger combined GPU partition, different entries point to different level 2 caches to distribute the load across the partition and better utilize the level 2 caches.

Figure 10:
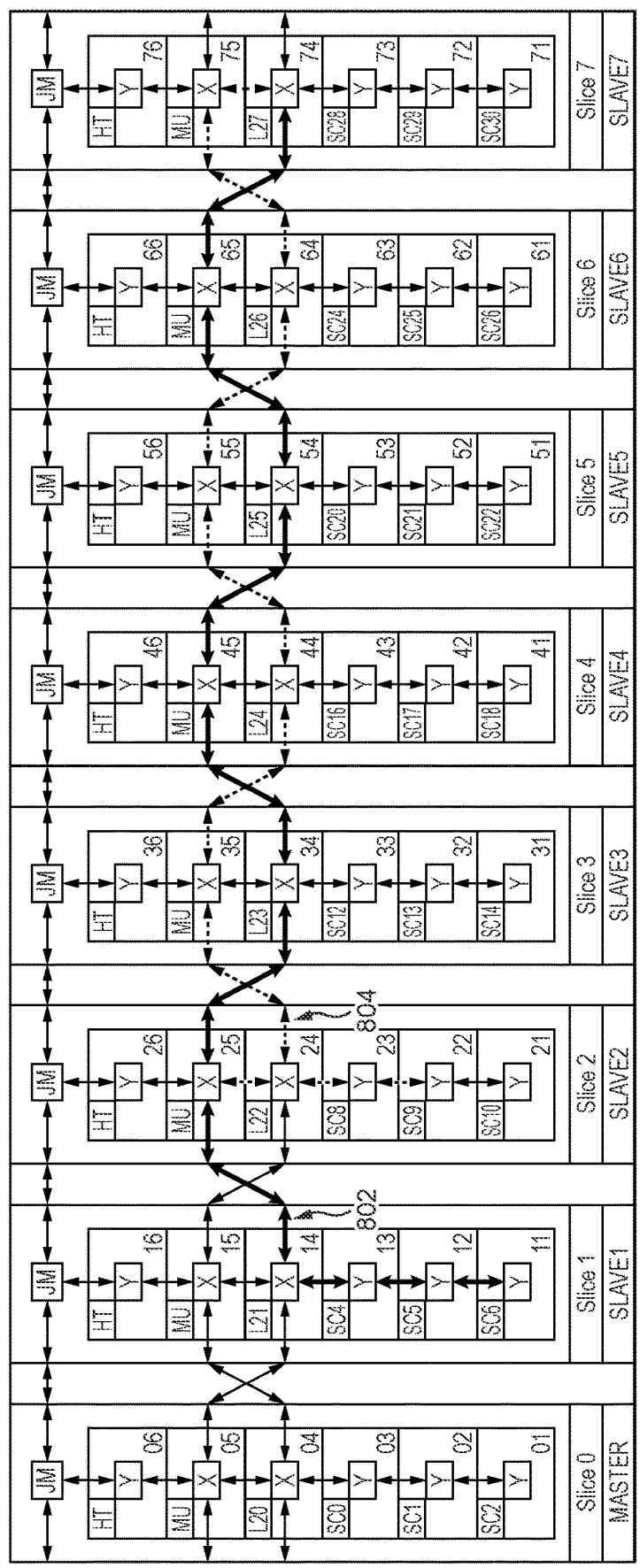
FIG. 10 illustrates the routing of messages in an embodiment of the technology described herein.

FIG. 10 shows how the functional units of the graphics processing units are addressed and messages are passed between functional units in an embodiment of the technology described herein. FIG. 10 shows an example of an eight graphics processing unit partition, in which the first graphics processing unit 800 acts as a master, with all the other graphics processing units acting as slaves. The equivalent operation will apply for partitions of fewer graphics processing units.

FIG. 10 shows the communications path 802 for an exemplary communication comprising a read request from shader core SC6 (at network coordinate 1,1) to level 2 cache L27 (at network coordinate 7,4). As shown in FIG. 10, this read request will traverse along the path:

{1,1}, {1,2}, {1,3}, {1,4}, {2,5}, {3,4}, {4,5}, {5,4}, {6,5}, {7,4}

The corresponding read response from L27 to SC6 will correspondingly traverse along the path:

{7,4}, {6,5}, {5,4}, {4,5}, {3,4}, {2,5}, {1,4}, {1,3}, {1,2}, {1,1}

On the other hand, a read request from SC9 (at 2,2) to L27 (at 7,4) will traverse along the path 804, namely:

{2,2}, {2,3}, {2,4}, {3,5}, {4,4}, {5,5}, {6,4}, {7,5}, {7,4} and the read response from L27 to SC9 will traverse along the path:

{7,4}, {6,5}, {5,4}, {4,5}, {3,4}, {2,5}, {2,4}, {2,3}, {2,2}

It can be seen that the traffic load for these requests (both to the same L2 cache L27) is distributed evenly between rows 4 and 5 of the network. This is because the request originates from shader cores on different (in this case adjacent) graphics processing units in the partition.

On the other hand, the read responses to the respective requesting shader cores from the L2 cache L27 both follow the same communications path along the sequence of connected graphics processing units in the partition (and then break from that path to the shader core in the graphics processing unit in question), because they originate from the same functional unit in the same graphics processing unit.

Figure 12:
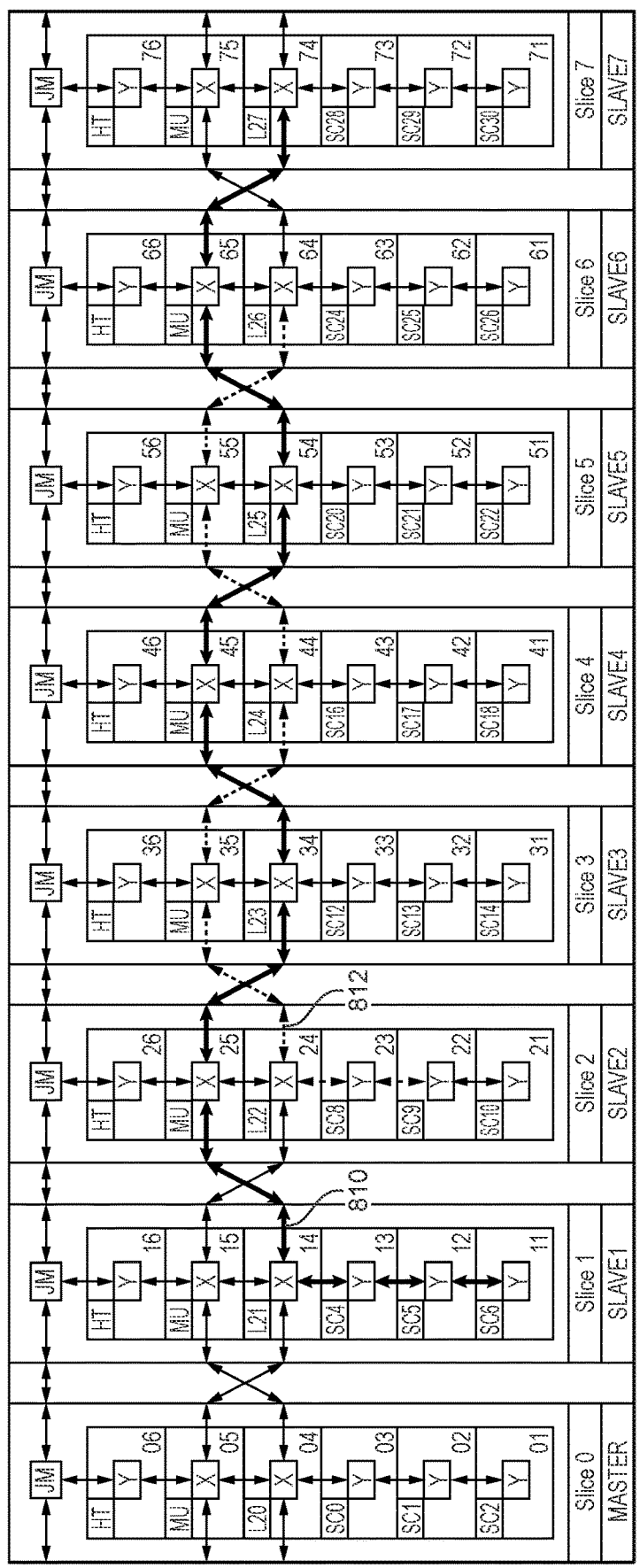
FIG. 12 illustrates the routing of messages in an embodiment of the technology described herein.

FIG. 12 shows the communications routing in another example, in this case where the requests from the shader cores are going to different caches (in particular, in the example shown in FIG. 12, from SC6 to L27 810, and from SC9 to L26 812).

In this case, again the traffic load for the requests to the L2 caches is distributed evenly between rows 4 and 5 of the network (as this is determined by the relative position of the "requesting" graphics processing unit in the sequence of connected graphics processing units in the partition). Thus in this case, again the traffic load for these requests to the respective target L2 caches is distributed evenly between rows 4 and 5 of the network, as the requesting shader cores are in adjacent graphics processing units in the partition.

However, in this case, the responses from the L2 caches are also distributed evenly between rows 4 and 5 of the network as the L2 caches are in different (and adjacent) graphics processing units in the partition. Thus, in this case, each respective pair of a request to an L2 cache and the response from the L2 cache follows a different communications path along the sequence of connected graphics processing units.

As can be seen from these examples and FIGS. 10 and 12 in general, the cross-connection of the communications bridge links has the effect that the position of the functional unit relative to the communications bridge in its processing unit and the position of the processing unit in the sequence of connected processing units, will determine which one of the communications paths provided by the connections of the communications bridges any traffic from that functional unit to an end point (e.g. a functional unit in another processing unit) will follow, and, in particular, the effect that communications from correspondingly positioned functional units in different (e.g. adjacent) processing units in the sequence will follow different communications paths along the sequence of connected processing units.

This then has the effect of more evenly distributing the communications traffic over the communications paths provided by the connections of the communications bridges based on the sources of the communication and the positions of the processing units in the connected sequence of processing units.

This leads to a better utilization of the network resources and a reduction in bottlenecks in the network, as compared, for example, to arrangements in which communications are routed from cache to cache of the graphics processing units, for example.

Figure 11:
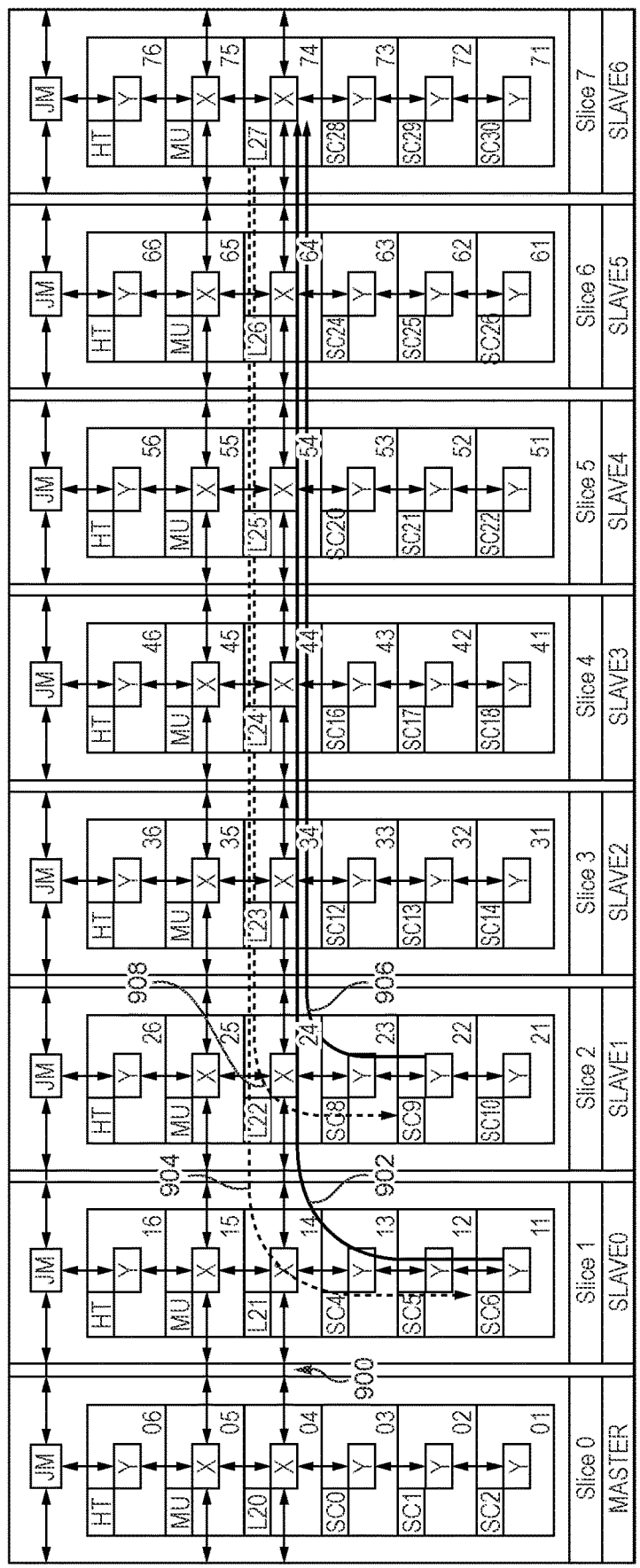
FIG. 11 illustrates the routing of messages in an arrangement that is not in accordance with the technology described herein.

FIG. 11 shows by way of comparison the communications paths followed by the messages illustrated in FIG. 10 in a system where the communications bridges 900 connect the caches of the adjacent graphics processing units (and the MMUs of the adjacent graphics processing units).

In this case, as shown in FIG. 11, a read request from SC6 to L27 will traverse along the path 902:
{1,1}, {1,2}, {1,3}, {1,4}, {2,4}, {3,4}, {4,4}, {5,4}, {6,4}, {7,4}
and the read response from L27 to SC6 will traverse along the path 904:
{7,4}, {6,4}, {5,4}, {4,4}, {3,4}, {2,4}, {1,4}, {1,3}, {1,2}, {1,1}
and a read request from SC9 to L27 will traverse along the path 906:
{2,2}, {2,3}, {2,4}, {3,4}, {4,4}, {5,4}, {6,4}, {7,4}
with the read response from L27 to SC9 traversing along the path 908:
{7,4}, {6,4}, {5,4}, {4,4}, {3,4}, {2,4}, {2,3}, {2,2}.

Figure 13:
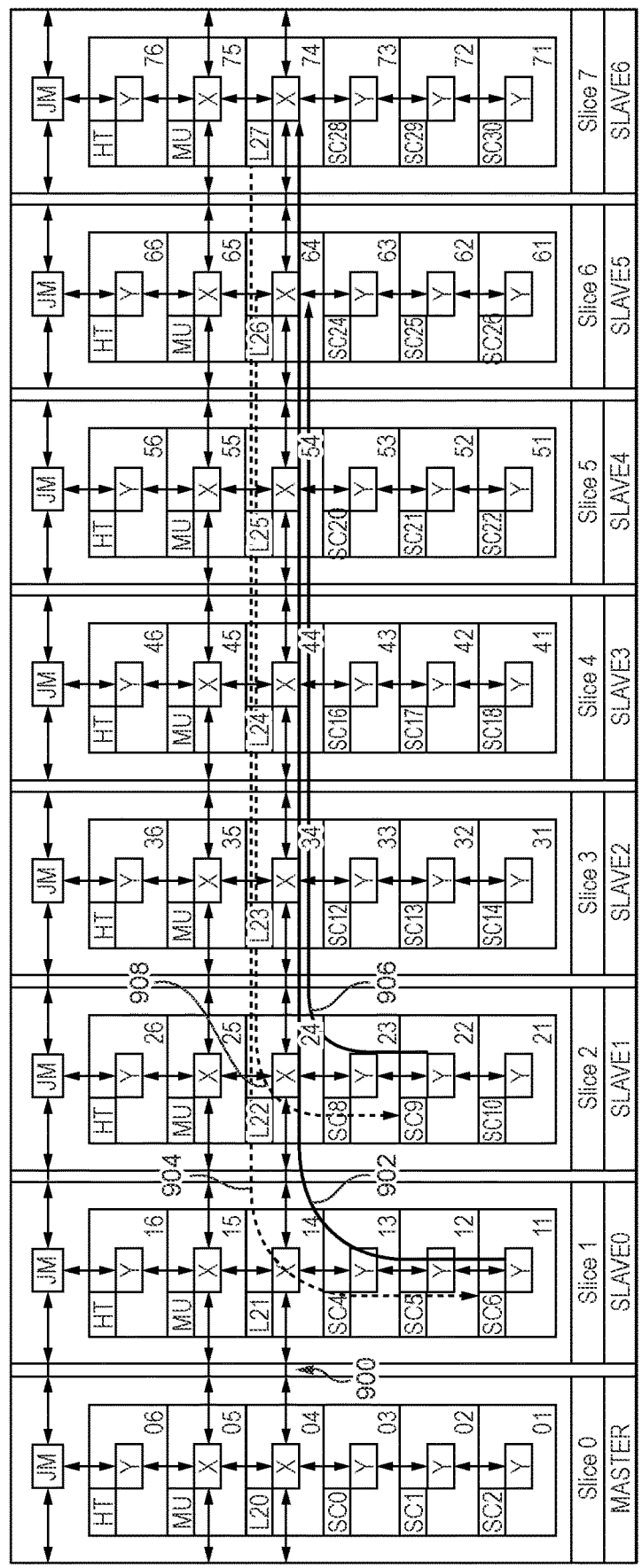
FIG. 13 illustrates the routing of messages in an arrangement that is not in accordance with the technology described herein.

FIG. 13 correspondingly shows by way of comparison the communications paths followed by the messages illustrated in FIG. 12 in the case where the communications bridges 900 connect the caches of the adjacent graphics processing units (and the MMUs of the adjacent graphics processing units).

It can be seen that in the cases illustrated in FIGS. 11 and 13 all of the traffic flow is now from/to nodes {n,1/2/3} to/from nodes {n,4}, with n being the slice number. This is a result of the L2 caches being connected to each other along the length of the graphics processing unit sequence. As such cache traffic is likely to be high in use, this will cause congestion in the network leading to a drop in performance.

The present embodiments reduce this congestion by distributing the cache traffic (and other inter-graphics processing unit traffic) though the nodes of the MMUs as well. This will then help to reduce or avoid congestion in the network.

The above embodiments show arrangements in which the communications bridges linking adjacent graphics processing units comprise two (crossed) connections. It would also be possible for each communications bridge linking a pair of graphics processing units to include more than two connections between the graphics processing units, if desired. In this case, each connection should again connect functional units (the nodes for functional units) having different positions in the internal network routing sequence of the individual graphics processing units.

Figure 14:
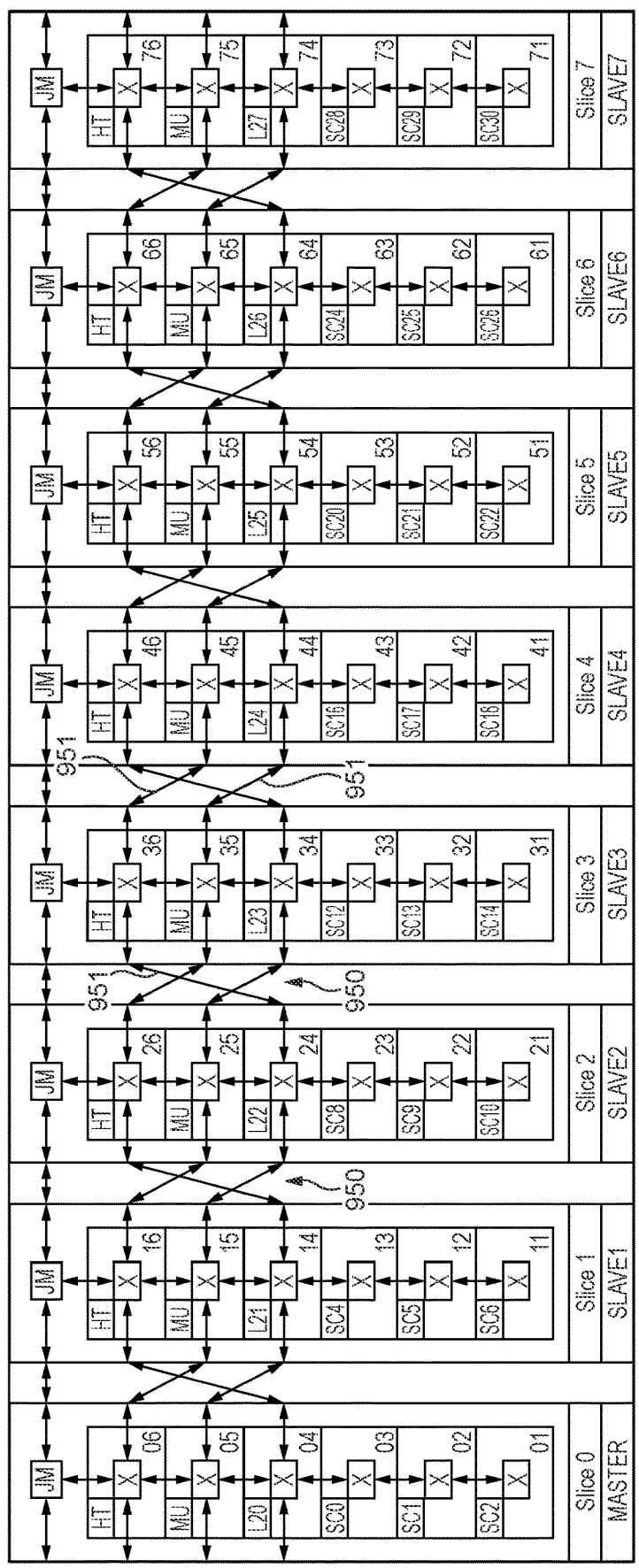
FIG. 14 shows in more detail the communications connections between graphics processing units in an embodiment.

FIG. 14 shows a further embodiment in this regard, in which each communications bridge 950 connecting a pair of graphics processing units comprises three separate communications links 951, with each such connection 951 connecting a respective pair of (the nodes for) functional units having different network routing positions in the connected graphics processing units.

This arrangement will accordingly provide three different communications paths linking a sequence of connected graphics processing units over which communications between the connected graphics processing units can be distributed (and will be distributed in dependence upon the position of the communication originator in its graphics processing unit and the position of the graphics processing unit in the sequence of connected graphics processing units).

Other arrangements for the communications bridges linking the connected graphics processing units would, of course, be possible.

As will be appreciated from the above, the technology described herein, in its embodiments at least, provides a data processing system comprising plural processing units that can either be operated as standalone processing units or as one or more linked sets of a master and one or more slave processing units, and in which communications between different linked processing units can be performed more efficiently and with reduced congestion, blockages, etc. In particular, the technology described herein, in its embodiments at least, provides such improved communication in a system that can be flexibly and variably reconfigured, but without the need for extensive additional and/or expensive communications paths and connections.

This is achieved, in the embodiments of the technology described herein at least, by connecting linked processing units using communications bridges that support two (or more) connections between the linked processing units, but with each connection linking internal communications network nodes (and functional units) of the processing units that have different positions in the internal network communications routing sequence of the processing units, and/or linking (nodes for) functional units of different types in the linked processing units.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A data processing system comprising:
a plurality of processing units, each processing unit of the plurality of processing units comprising:
a set of plural functional units; and
an internal communications network configured to route communications between the functional units of the processing unit, the internal communications network comprising a plurality of network nodes, each functional unit being associated with a node of the internal communications network;
wherein:
the internal communications networks of the processing units are each configured to route communications between at least some of the nodes of the internal communications network in the same routing sequence order of those nodes; and
each processing unit of the plurality of processing units is connected to at least one other processing unit of the plurality of processing units via a communications bridge that can allow communication between the connected processing units, each communications bridge connecting a pair of processing units comprising at least two connections, each connection being configured to route communications between a respective pair of nodes of the internal communications networks of the connected pair of processing units, wherein each connected pair of network nodes comprises network nodes having different positions in the internal communications network routing sequence order of the network nodes;
whereby:
the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge; and
functional units in processing units that are connected via a communications bridge and that each have the same relative position in the internal communications network of the processing units relative to the communications bridge connecting the processing units will use a different one of the connections of the communications bridge when communicating with the connected processing unit via the communications bridge connecting the pair of processing units.

2. The system of claim 1, wherein the processing units are all graphics processing units, or are all video processing units, or are all machine learning accelerators, or are all neural network processing units.

3. The system of claim 1, wherein the internal communications networks for routing communications between the functional units of the processing units are configured to carry one or both of: memory transaction communications between functional units of the processing units; and control communications between functional units of the processing units.

4. The system of claim 1, wherein the communications routing sequence order over the internal network of each processing unit is from an execution unit to a cache to a memory management unit and vice-versa.

5. The system of claim 1, wherein the processing units are connected by the communications bridges as a linear sequence of the processing units, with respective communications bridges connecting adjacent processing units in the linear sequence.

6. The system of claim 1, wherein the connections of the communications bridges connect nodes that have adjacent positions in the internal communications network routing sequence order of the nodes in the connected processing units.

7. The system of claim 1, wherein the connections of the communications bridges connect nodes associated with functional units of different types in the connected processing units.

8. The system of claim 7, wherein the connections of the communications bridges each connect a node associated with a cache in one of the connected processing units to a node associated with a functional unit other than a cache in the other connected processing unit.

9. The system of claim 1, wherein the processing units are able to be configured as respective partitions of processing units, with each partition comprising a subset of one or more of the processing units linked by respective communications bridges.

10. The system of claim 9, wherein each processing unit has a cache and the routing of data to the caches of the processing units is configured such that:
for a partition comprising a single processing unit only, in which the processing unit operates independently of the other processing units to perform a processing task, all data to be cached for the processing unit will be stored in the cache of that processing unit; and
for a partition comprising two or more of the processing units operating as a linked set of processing units, data to be cached for the set of two or more processing units will be distributed across different caches of the caches of the processing units of the linked set of processing units.

11. The system of claim 1, wherein the nodes that are connected by a communications bridge connection are configured to prioritise forwarding communications over the communications bridge connection, and the nodes that are not connected by a communications bridge connection are configured to prioritise forwarding communications over the internal communications network.

12. A method of operating a data processing system, the data processing system comprising:
a plurality of processing units, each processing unit of the plurality of processing units comprising:
a set of plural functional units, and
an internal communications network configured to route communications between the functional units of the processing unit, the internal communications network comprising a plurality of network nodes, each functional unit being associated with a node of the internal communications network;

wherein:
the internal communications networks of the processing units are each configured to route communications between at least some of the nodes of the internal communications network in the same routing sequence order of those nodes; and each processing unit of the plurality of processing units is connected to at least one other processing unit of the plurality of processing units via a communications bridge that can allow communication between the connected processing units, each communications bridge connecting a pair of processing units comprising at least two connections, each connection being configured to route communications between a respective pair of nodes of the internal communications networks of the connected pair of processing units, wherein each connected pair of network nodes comprises network nodes having different positions in the internal communications network routing sequence order of the network nodes;

whereby:
the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge; and functional units in processing units that are connected via a communications bridge and that each have the same relative position in the internal communications network of the processing units relative to the communications bridge connecting the processing units will use a different one of the connections of the communications bridge when communicating with the connected processing unit via the communications bridge connecting the pair of processing units;

the method comprising:
when sending a communication from a functional unit of a first processing unit to a connected second processing unit via a communications bridge linking the processing units, the functional unit having a first position relative to the communications bridge linking the processing units, sending the communication over a first one of the connections of the communications bridge linking the processing units; and when sending a communication from a functional unit of the connected second processing unit which has the same relative position to the communications bridge linking the processing units in the internal communications network of the second processing unit to the first position relative to the communications bridge linking the processing units of the functional unit in the first processing unit to the first processing unit via the communications bridge linking the processing units, sending the communication over another one of the connections of the communications bridge linking the processing units that is different to the first one of the connections of the communications bridge linking the processing units.

13. The method of claim 12, wherein the communication is a memory transaction communication between functional units of the processing units or a control communication between functional units of the processing units.

14. The method of claim 12, comprising sending the communication over one of the connections of the communications bridge linking the processing units from a node associated with a functional unit of the first processing unit to a node associated with a functional unit of a different type in the second processing unit.

15. The method of claim 14, comprising sending the communication over one of the connections of the communications bridge linking the processing units from a node associated with a cache of the first processing unit to a node associated with a functional unit other than a cache in the second processing unit, or from a node associated with a functional unit other than a cache of the first processing unit to a node associated with a cache in the second processing unit.

16. The method of claim 12, comprising:
when sending a communication over a sequence of three connected processing units via communications bridges linking the processing units:
sending the communication from a node of a first processing unit of the sequence over a communications bridge connection to a node of a second processing unit of the sequence that has a different position in the internal communications network routing sequence order of the network nodes in the second processing unit to the position in the internal communications network routing sequence order of the network nodes of the node in the first processing unit; and
sending the communication from the node of the second processing unit of the sequence over a communication bridge connection to a node of a third processing unit of the sequence that has a different position in the internal communications network routing sequence order of the network nodes in the third processing unit to the position in the internal communications network routing sequence order of the network nodes of the node in the second processing unit.

17. The method of claim 12, comprising:
when sending a communication over a sequence of three connected processing units via communications bridges linking the processing units:
sending the communication from a node associated with a functional unit of one type of a first processing unit of the sequence over a communications bridge connection to a node associated with a functional unit of a different type of a second processing unit of the sequence; and
sending the communication from a node associated with the functional unit of the second processing unit of the sequence over a communication bridge connection to a node associated with a functional unit of a different type to the functional unit of the second processing unit of the sequence of a third processing unit of the sequence.

18. A non-transitory computer readable storage medium comprising computer software code which when executing on at least one processor performs a method of operating a data processing system, the data processing system comprising:
a plurality of processing units, each processing unit of the plurality of processing units comprising:
a set of plural functional units, and an internal communications network configured to route communications between the functional units of the processing unit, the internal communications network comprising a plurality of network nodes, each functional unit being associated with a node of the internal communications network;

wherein:

the internal communications networks of the processing units are each configured to route communications between at least some of the nodes of the internal communications network in the same routing sequence order of those nodes; and each processing unit of the plurality of processing units is connected to at least one other processing unit of the plurality of processing units via a communications bridge that can allow communication between the connected processing units, each communications bridge connecting a pair of processing units comprising at least two connections, each connection being configured to route communications between a respective pair of nodes of the internal communications networks of the connected pair of processing units, wherein each connected pair of network nodes comprises network nodes having different positions in the internal communications network routing sequence order of the network nodes;

whereby:

the communications bridge connection that a functional unit of a processing unit will use to communicate with a functional unit of another processing unit via a communications bridge connecting the processing units will depend upon the position of the internal communications network node associated with the functional unit in the routing sequence order of the nodes of the internal communications network of the processing unit relative to the communications bridge; and functional units in processing units that are connected via a communications bridge and that each have the same relative position in the internal communications network of the processing units relative to the communications bridge connecting the processing units will use a different one of the connections of the communications bridge when communicating with the connected processing unit via the communications bridge connecting the pair of processing units;

the method comprising:

when sending a communication from a functional unit of a first processing unit to a connected second processing unit via a communications bridge linking the processing units, the functional unit having a first position relative to the communications bridge linking the processing units, sending the communication over a first one of the connections of the communications bridge linking the processing units; and when sending a communication from a functional unit of the connected second processing unit which has the same relative position to the communications bridge linking the processing units in the internal communications network of the second processing unit to the first position relative to the communications bridge linking the processing units of the functional unit in the first processing unit to the first processing unit via the communications bridge linking the processing units, sending the communication over another one of the connections of the communications bridge linking the processing units that is different to the first one of the connections of the communications bridge linking the processing units.

\* \* \* \* \*